(12) United States Patent
Owari

(10) Patent No.: US 10,908,777 B2
(45) Date of Patent: Feb. 2, 2021

(54) IMAGE FORMING METHOD AND IMAGE FORMING APPARATUS

(71) Applicant: Oki Data Corporation, Tokyo (JP)

(72) Inventor: Atsushi Owari, Tokyo (JP)

(73) Assignee: Oki Data Corporation, Tokyo (JP)

( * ) Notice: Subject to any disclaimer, the term of this patent is extended or adjusted under 35 U.S.C. 154(b) by 19 days.

(21) Appl. No.: 15/982,367

(22) Filed: May 17, 2018

(65) Prior Publication Data

US 2018/0350325 A1 Dec. 6, 2018

(30) Foreign Application Priority Data

May 31, 2017 (JP) .................... 2017-107317

(51) Int. Cl.
| | | |
|---|---|---|
| G06F 3/0482 | (2013.01) | |
| G06F 3/01 | (2006.01) | |
| G06F 16/16 | (2019.01) | |
| G06F 3/0488 | (2013.01) | |
| G09G 5/36 | (2006.01) | |
| G06T 1/20 | (2006.01) | |

(52) U.S. Cl.
CPC ............ *G06F 3/0482* (2013.01); *G06F 3/01* (2013.01); *G06F 3/0488* (2013.01); *G06F 16/16* (2019.01); *G06T 1/20* (2013.01); *G09G 5/363* (2013.01)

(58) Field of Classification Search
CPC ..... G09G 5/363; G06F 3/0488; G06F 3/0482; G06F 3/01; G06F 16/16; G06T 1/20; H04N 1/00389; H04N 1/00424; H04N 1/00411; H04N 1/00474; H04N 1/0482; H04N 2201/0094
See application file for complete search history.

(56) References Cited

U.S. PATENT DOCUMENTS

2006/0023243 A1* 2/2006 Asai .................... H04N 1/00435 358/1.13
2012/0311469 A1* 12/2012 Kunori ................. G06F 3/04845 715/762

(Continued)

FOREIGN PATENT DOCUMENTS

| JP | 2001-285534 A | 10/2001 |
|---|---|---|
| JP | 2006120087 A | 5/2006 |

(Continued)

*Primary Examiner* — Ajay M Bhatia
*Assistant Examiner* — Mong-Shune Chung
(74) *Attorney, Agent, or Firm* — Rabin & Berdo, P.C.

(57) ABSTRACT

An image forming apparatus includes a display unit that displays a first screen handled as a target of recalling and a second screen not handled as a target of the recalling, as screens for making a setting in a process of executing a prescribed function; a storage unit that stores setting information including a first set value set on the first screen, a second set value set on the second screen and first screen information regarding the first screen, while associating the setting information with a first name; and a selection unit that selects the first name stored in the storage unit, wherein when the first name stored in the storage unit is selected by the selection unit, a control unit displays a redisplay screen including the first screen associated with the first name on the display unit and prompts resetting of the first set value on the redisplay screen.

14 Claims, 22 Drawing Sheets

(56) References Cited

U.S. PATENT DOCUMENTS

| | | | | |
|---|---|---|---|---|
| 2016/0072971 A1* | 3/2016 | Ozaki | ................ | H04N 1/00482 |
| | | | | 358/1.15 |
| 2016/0094735 A1* | 3/2016 | Ogura | ................ | H04N 1/00389 |
| | | | | 358/1.15 |
| 2019/0107937 A1* | 4/2019 | Morita | ................ | G06F 3/04817 |

FOREIGN PATENT DOCUMENTS

| | | | | |
|---|---|---|---|---|
| JP | 2010157841 A | * | 7/2010 | |
| JP | 2012039328 A | | 2/2012 | |

* cited by examiner

FIG. 5

| INDEX NO. | SETTING INFO. REGISTRATION NAME | FUNCTION | SETTING ITEM | SET VALUE | SETTING CHANGE FLOW |
|---|---|---|---|---|---|
| 1 | SPECIAL COPY | COPY | NUMBER OF COPIES | 1 | (SEE FIG. 8A) ↓ DEPRESS "NEXT" BUTTON ↑ DEPRESS "RETURN" BUTTON (SEE FIG. 8B) ↓ DEPRESS "NEXT" BUTTON ↑ DEPRESS "RETURN" BUTTON (SEE FIG. 8C) → DEPRESS "NEXT" BUTTON (SEE FIG. 28) |
| | | | COLOR MODE | AUTO | |
| | | | SHEET FEED TRAY | TRAY2 | |
| | | | DOUBLE-SIDE | OFF | |
| | | | AGGREGATION | OFF | |
| | | | SCALING | 145% | |
| | | | SCAN SIZE | A4 | |
| | | | FRAME ERASURE | ON | |
| | | | CENTER ERASURE | ON | |
| | | | SCAN RESOLUTION | NORMAL | |
| | | | DOCUMENT TYPE | TEXT/PHOTO | |
| | | | BACKGROUND REMOVAL | MIDDLE | |
| | | | DENSITY | 0 | |
| | | | CONTRAST | 0 | |
| | | | HUE CONTROL | 0 | |
| | | | SATURATION CONTROL | 0 | |
| | | | RED CONTROL | 0 | |
| | | | GREEN CONTROL | 0 | |
| | | | BLUE CONTROL | 0 | |
| | | DEVICE SETTING | TRAY2 SHEET SIZE | A3 | |
| 2 | WEEKLY REPORT TRANSMISSION | SHARED FOLDER | COLOR MODE | MONOCHROME | |
| | | | SCAN SIZE | B5 | |
| | | | · | · | |
| · | | | | | |
| 20 | UNREGISTERED | | | | |

FIG. 30

| SETTING INFORMATION REGISTRATION NAME | | |
|---|---|---|
| WEEKLY REPORT | CALL UP | DETAILS |
| SPECIAL COPY | CALL UP | DETAILS |
| PAYMENT | CALL UP | DETAILS |

□DEVICE SETTING  □LOG OUT — 113

213a → SPECIAL COPY

1/1

RETURN

FIG. 31

TRAY (1/3)  ? — 102b

- ■AUTO
- ■TRAY1 (A4)
- ■TRAY2 (A3)
- ■TRAY3 (LETTER)
- ■MP TRAY (A4)

NEXT — 202c

FIG. 32

TRAY2 SHEET SIZE (2/3)  ? — 103b

| A3 | A4 | A5 |
| B4 | B5 | B6 |
| LETTER | LEGAL14 | LEGAL13 |
| POSTCARD | | |

RETURN  NEXT — 203c

IMAGE FORMING METHOD AND IMAGE FORMING APPARATUS

BACKGROUND OF THE INVENTION

1. Field of the Invention

The present invention relates to an image forming apparatus, and in particular, to an image forming method and an image forming apparatus capable of registering and calling up set value information on functions of the apparatus.

2. Description of the Related Art

Conventionally, there is a technology that makes it possible to store pieces of information on image forming apparatus's function settings freely made by a user, as a group of information, call up the stored setting information, and overwrite current setting information with the acquired setting information. See Japanese Patent Application Publication No. 2001-285534 (page 7, FIG. 14), for example.

However, in cases where alteration of a set value is made after calling up the setting information, the user's operations to move back and forth through a lot of screens are necessary. Even in cases where data as a combination of various set values is previously prepared and registered individually as a measure to avoid the complexity of the operations, the number of registered pieces of data increases and the operation for making a selection from these data is burdensome.

SUMMARY OF THE INVENTION

An image forming method according to the present invention includes a first step of designating a first screen to be a target of recalling among a plurality of screens for making settings and registering a first name while associating the first screen with the first name, in a process of executing a prescribed function; a second step of displaying a redisplay screen that includes the first screen associated with the first name and prompting resetting on the redisplay screen, when the first name is selected; and a third step of executing the prescribed function when the execution of the prescribed function is commanded.

An image forming apparatus according to the present invention includes a display unit that displays a first screen handled as a target of recalling and a second screen not handled as a target of the recalling, as screens for making a setting in a process of executing a prescribed function; a storage unit that stores setting information including a first set value set on the first screen, a second set value set on the second screen and first screen information regarding the first screen, while associating the setting information with a first name; a selection unit that selects the first name stored in the storage unit; and a control unit that controls processing in the display unit, the storage unit and the selection unit, wherein when the first name stored in the storage unit is selected by the selection unit, the control unit displays a redisplay screen including the first screen associated with the first name on the display unit and prompts resetting of the first set value on the redisplay screen.

According to the present invention, setting screens of setting items having a high possibility of resetting, previously selected from a lot of setting items, are successively displayed and the resetting is made possible, by which the complexity at the time of making the setting of each setting item, including the resetting, can be eliminated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein

FIGS. 4A and 4B are diagrams showing display examples of a registration confirmation screen displayed on the touch panel, wherein FIG. 4A shows a display example of a first registration confirmation screen displayed when a setting change screen exists and FIG. 4B shows a display example of a second registration confirmation screen displayed when no setting change screen exists;

FIG. 5 is an explanatory diagram showing the contents of registered setting information stored in a setting information storage unit while being grouped with indices;

FIGS. 8A to 8C are diagrams showing examples of setting screens generated according to the setting change flow, wherein FIG. 8A shows a sheet feed tray setting screen as the first page, FIG. 8B shows a TRAY2 sheet size setting screen as the second page, and FIG. 8C shows a scaling setting screen as the third page;

FIG. 30 is a screen diagram showing a display example of a setting information registration name list screen displayed on the touch panel;

FIG. 31 is a screen diagram showing a display example of the sheet feed tray setting screen displayed on the touch panel;

FIG. 32 is a screen diagram showing a display example of the TRAY2 sheet size setting screen displayed on the touch panel;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
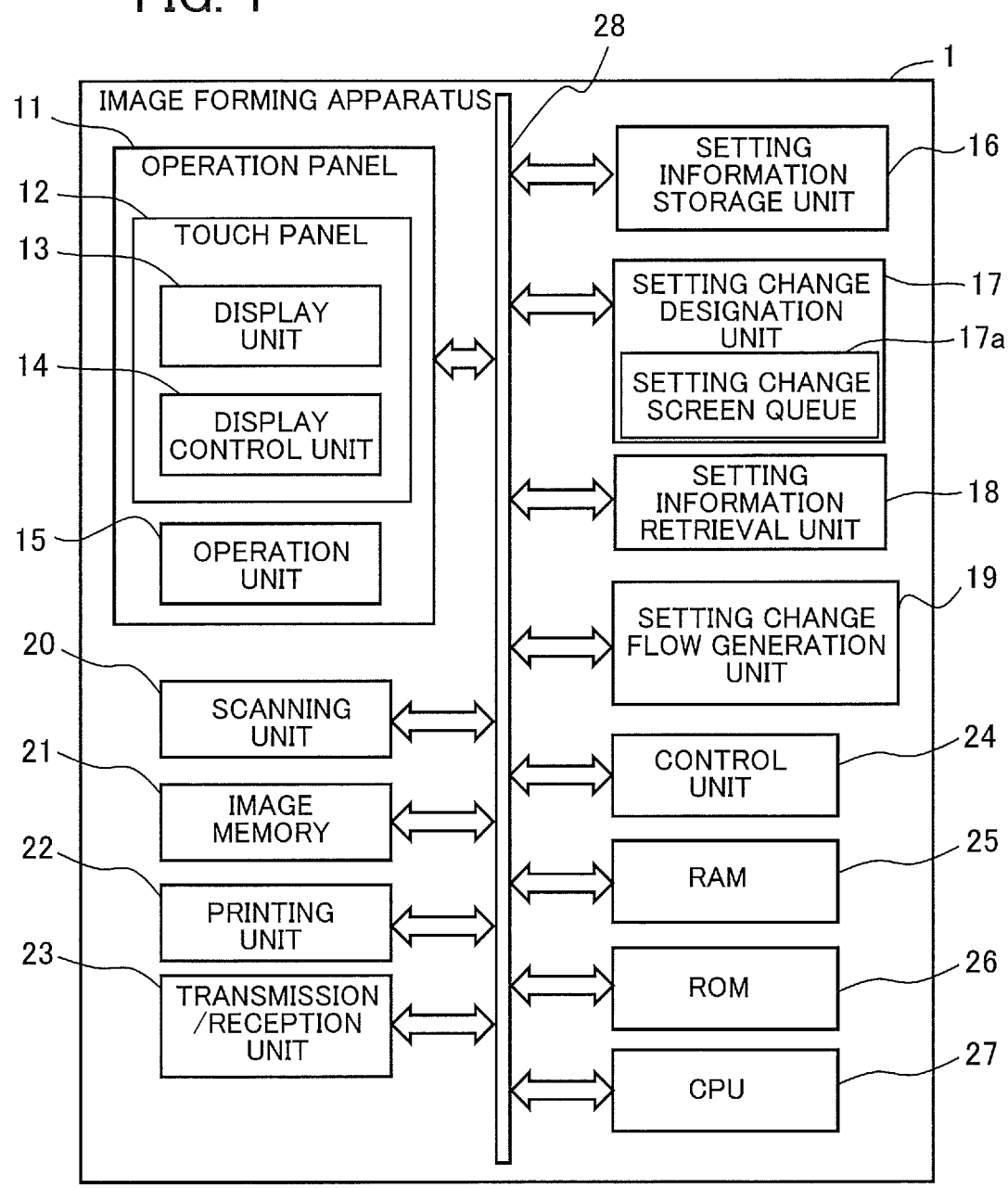
FIG. 1 is a block diagram showing a configuration of a principal part of a first embodiment of an image forming apparatus according to the present invention.

FIG. 1 is a block diagram showing a configuration of a principal part of a first embodiment of an image forming apparatus 1 according to the present invention.

The image forming apparatus 1 includes an operation panel 11, a setting information storage unit 16, a setting change designation unit 17, a setting information retrieval unit 18, a setting change flow generation unit 19, a scanning unit 20 for optically reading an image, an image memory 21, a printing unit 22, a transmission/reception unit 23, a control unit 24, a RAM 25, a ROM 26, a CPU 27 and a common bus 28.

The operation panel 11 includes an operation unit 15 and a touch panel 12 serving as a selection unit having a display unit 13 and a display control unit 14 as a control unit, and has functions for operating the image forming apparatus 1, such as logging in through the inputting of authentication information, executing each function, setting each function's condition and the like, and transmitting image data. The setting information storage unit 16 stores setting information held by the image forming apparatus 1.

As will be described in detail, the setting change designation unit 17 temporarily stores data of setting change screens, as setting screens having a high possibility of resetting of a set value and desired to be called up again, in the setting change screen queue 17a in response to an operation on the operation panel 11 so that those setting change screens (e.g. only those setting change screens) are displayed in a wizard format when the setting information is called up by the setting information retrieval unit 18. Among the setting screens, those temporarily registered in the setting change screen queue 17a can be referred to as setting change screens in the following description.

The setting information retrieval unit 18 calls up intended setting information from the setting information storage unit 16. The setting change flow generation unit 19 generates a setting change flow in a wizard format by using screen data of setting change screens temporarily stored in the setting change screen queue of the setting change designation unit 17. The scanning unit 20 makes the image memory 21, for temporarily storing image data, temporarily store scanned image data. The printing unit 22 prints the image data stored in the image memory 21.

The transmission/reception unit 23 transmits and receives data to/from an external device via a telephone circuit or a communication network according to a facsimile communication protocol or a network-related protocol such as TCP/IP. The control unit 24 controls the whole of the image forming apparatus 1 in an integrated manner. The RAM 25 stores a variety of information necessary for controlling operations of various functions of the image forming apparatus 1. The ROM 26 stores in advance information such as control programs of the image forming apparatus 1. The CPU 27 performs arithmetic processing and the like according to commands from the control unit 24. The common bus 28 is a signal line connecting the aforementioned components of the image forming apparatus 1.

Figure 2:
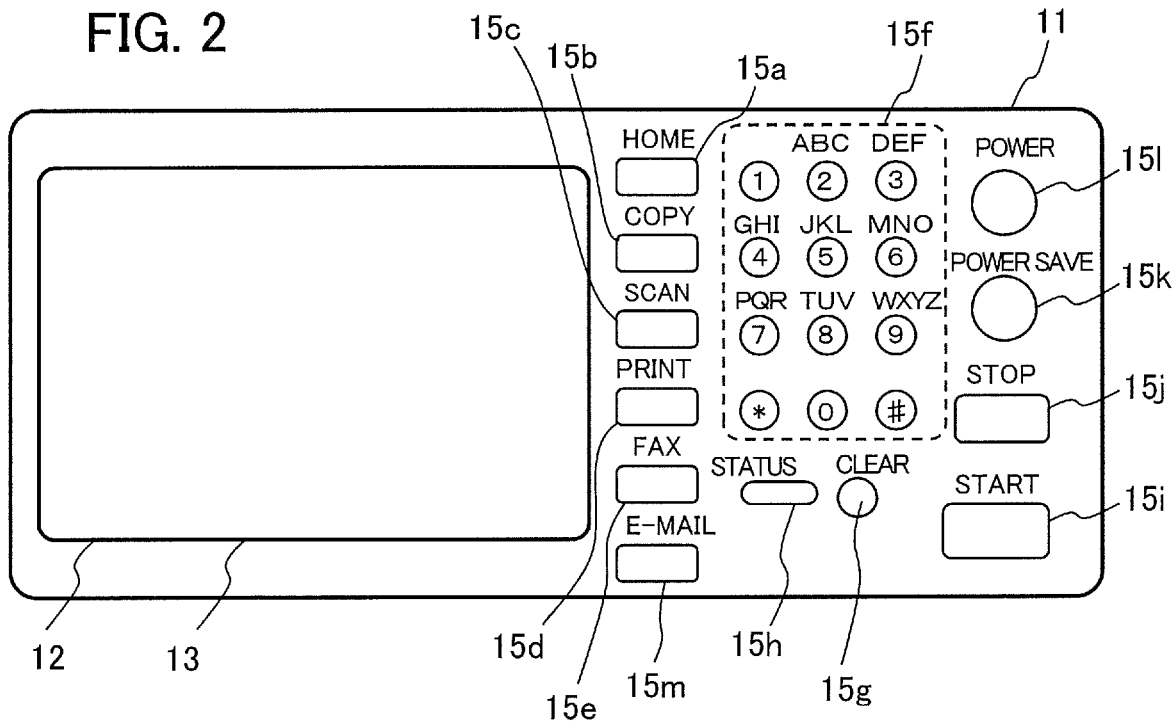
FIG. 2 is an external view of an operation panel of the image forming apparatus.

FIG. 2 is an external view of the operation panel 11.

In FIG. 2, the operation unit 15 (FIG. 1) includes a start key 15i for issuing an operation command to the image forming apparatus 1, a stop key 15j for canceling an operation, a home key 15a, a copy key 15b, a scan key 15c, a print key 15d, a fax key 15e and an e-mail key 15m for switching the function in order to execute one of home/copy/scan/print/fax/e-mail functions, a numeric keypad 15f for inputting alphanumeric characters and symbols, a clear key 15g for clearing the characters and symbols inputted through the numeric keypad 15f, a status key 15h for checking the status of the image forming apparatus 1, a power save key 15k for shifting the image forming apparatus 1 to a power saving mode, and a power key 15l as the power switch of the image forming apparatus 1. A display control unit 14 (FIG. 1) which will be described later is notified of the depressing of each of the above-described keys each time the key is depressed.

The display unit 13 (FIG. 1) has a function of displaying a screen according to control by the display control unit 14 (FIG. 1) which will be described later or an operation on the operation unit 15. The display unit 13 corresponds to the touch panel 12 in the external view of FIG. 2. Incidentally, as will be explained later, the display control unit 14 is notified of the depressing of each software button displayed on the display unit 13 each time the software button is depressed.

The display control unit 14 (FIG. 1) has a function of managing the screen transition and behavior at times of the user's depressing of each key of the operation unit 15 in response to the display content on the display unit 13 and at times of the user's depressing of each button displayed on the display unit 13, and controlling the display on the display unit 13.

The display control unit 14 also has a function of notifying the setting change designation unit 17 of a function name and a screen name of an icon button as will be explained later when the icon button on a setting screen displayed on the display unit 13 is depressed, and a function of acquiring default setting information from the setting information storage unit 16 and comparing the contents of a setting change with the default setting information when a setting operation is completed, identifying each setting item differing from the default, and commanding the display unit 13 to attach an alteration mark to the identified setting item on a screen to be displayed.

Figure 3:
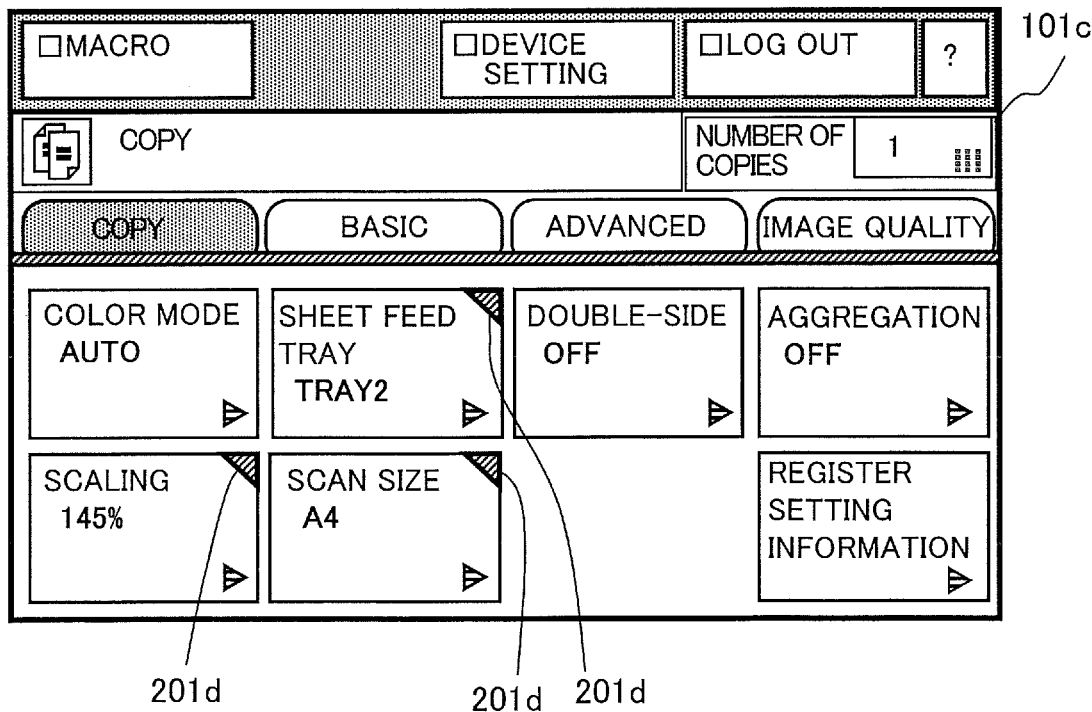
FIG. 3 is a screen diagram showing a display example of a copy standby screen displayed on a touch panel and including items in which set values have been changed from default values.
Figure 17:
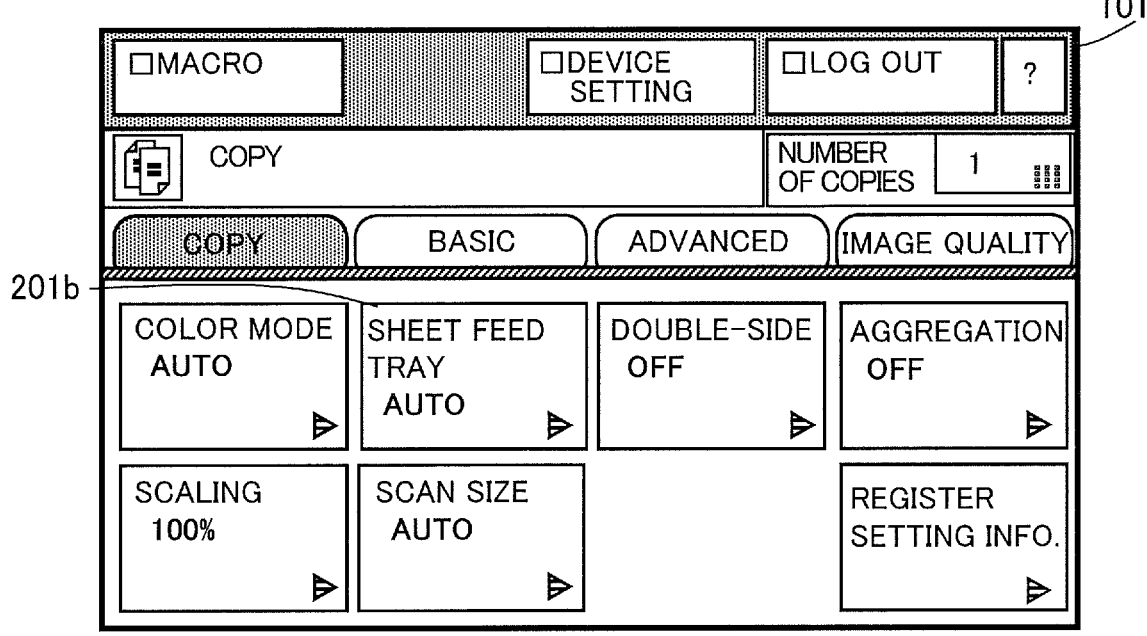
FIG. 17 is a screen diagram showing a display example of the copy standby screen displayed on the touch panel.

FIG. 3 is a screen diagram showing a display example of a copy standby screen 101c displayed on the touch panel 12 (which includes the display unit 13 in FIG. 2) after set values are changed from default values in some setting items as will be described later on a copy standby screen 101 (FIG. 17) set at the default values.

This example shows a case where the set values of some setting items have been changed from the default values as will be described later: the sheet feed tray from automatic (i.e., AUTO) to tray #2 (i.e., TRAY2), the scan size from automatic to A4 size (i.e., A4), and the scaling from 100% to 145%, wherein an alteration mark 201d is additionally displayed in each display part (each display button in this example) corresponding to a changed setting item.

As will be described later, the display control unit 14 also has a function of requesting the setting change flow generation unit 19 to generate a setting change flow in a wizard format enabling a further setting change when a command for registering changed setting information is issued, and a function of commanding the display unit 13 to display names, etc. of setting change screens appearing according to the setting change flow as a registration confirmation screen when completion of generating the setting change flow is reported from the setting change flow generation unit 19.

Figure 4A:
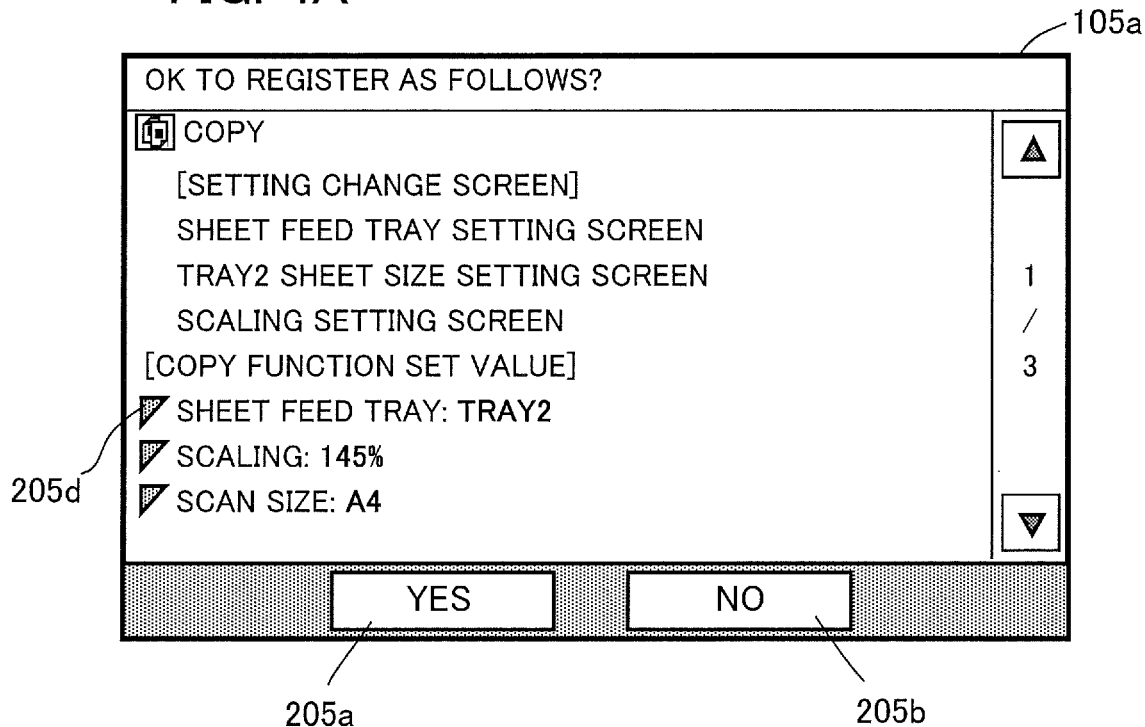
Figure 4B:
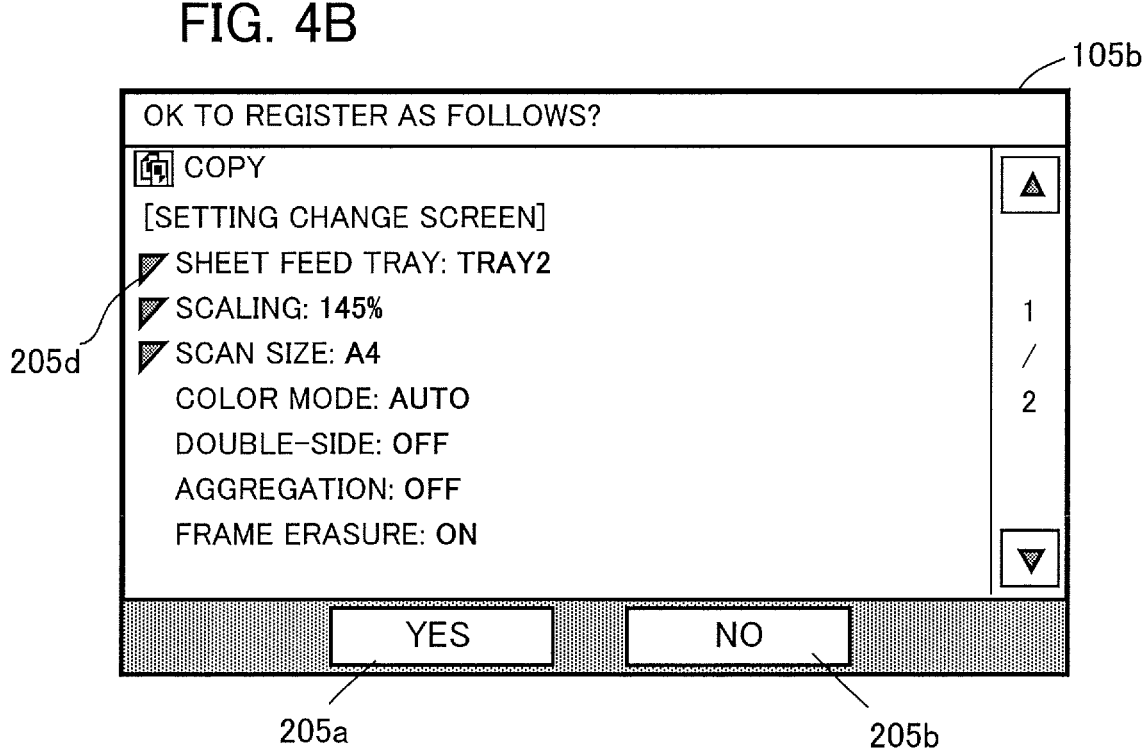

FIGS. 4A and 4B are diagrams showing display examples of the registration confirmation screen displayed on the touch panel 12 in this case. FIG. 4A shows a display example of a first registration confirmation screen 105a displayed when a setting change screen exists and FIG. 4B shows a display example of a second registration confirmation screen 105b displayed when no setting change screen exists.

When data of one or more registered setting change screens exist in the setting change screen queue 17a (a case where data of a "sheet feed tray setting screen", a "TRAY2 sheet size setting screen" and a "scaling setting screen" exist is shown in this example), it is indicated that screens having the names listed in the section "setting change screen" shown in FIG. 4A, i.e., setting change screens named "sheet feed tray setting screen", "TRAY2 sheet size setting screen" and "scaling setting screen", are the screens appearing in the setting change flow.

In contrast, when no setting change screen data has been stored in the setting change screen queue 17a of the setting change designation unit 17, the display unit 13 is commanded to display a registration confirmation screen omitting the section of the setting change screens as shown in FIG. 4B.

Incidentally, as shown in FIG. 4A, on the first registration confirmation screen 105a, in addition to the setting change screens, corresponding items such as "sheet feed tray" and their respective set values are displayed as "copy function set values", and an alteration mark 205d is further displayed at each item whose set value has been changed from the default value. When no setting change screen data exists, the corresponding items, set values and alteration marks of the "copy function set values" (e.g., only the corresponding items, set values and alteration marks of the "copy function set values") are displayed as shown in FIG. 4B.

The display control unit 14 also has a function of storing a "function name of a function to which each setting item belongs", a "setting information registration name" and "setting items whose set values have been finalized" in the setting information storage unit 16 as will be explained later when the registration of the setting information is completed, and a function of sending a "setting change flow" registration request to the setting change flow generation unit 19 when a setting change flow is generated by the setting change flow generation unit 19. Incidentally, it is assumed in the following description that the setting information includes "set value information (setting items whose set values have been finalized" and further includes a "setting change flow" in cases where the "setting change flow" has been generated.

The display control unit 14 also has a function of requesting the setting information retrieval unit 18 to call up setting information by designating the setting information as the object of calling up as will be described later when a command for calling up the setting information is issued, a function of performing display screen control and displaying pertinent screens on the display unit 13 according to a setting change flow when the setting change flow is included in the setting information received from the setting information retrieval unit 18, and a function of acquiring the default setting information from the setting information storage unit 16 and comparing the contents of the setting change with the default setting information when the setting change flow is exited, identifying each setting item different from the default, and commanding the display unit 13 to attach the alteration mark 201d (FIG. 3) to the identified setting item on the screen to be displayed.

The setting information storage unit 16 as a storage unit stores the default set value of each of the setting items that have been set as conditions of the functions of the image forming apparatus 1. Table 1 shows the contents of the setting items and their default values stored in the setting information storage unit 16 in regard to the copy function as a prescribed function. The setting information storage unit 16 also has a function of storing pieces of setting information that underwent a setting change by the user's setting operation as a group of information as will be described later.

TABLE 1

Setting Item Names and Default Values of Copy Function

| Function | Setting Item Name | Default Value |
|---|---|---|
| | Number Of Copies | 1 |
| | Color Mode | Automatic |
| | Sheet Feed Tray | Automatic |
| | Double-Side | Off |
| | Aggregation | Off |
| | Scaling | 100% |
| | Scan Size | Automatic |
| | Frame Erasure | On |
| | Center Erasure | On |
| | Scan Resolution | Normal |
| | Document Type | Text/Photo |
| | Background Removal | Middle |
| | Density | 0 |
| | Contrast | 0 |
| | Hue Control | 0 |
| | Saturation Control | 0 |
| | Red Control | 0 |
| | Green Control | 0 |
| | Blue Control | 0 |
| Device Setting | TRAY2 Sheet Size | A4 |
| Shared Folder | Color Mode | Monochrome |
| | Scan Size | A4 |
| | . | . |
| | . | . |
| | . | . |

Figure 6A:
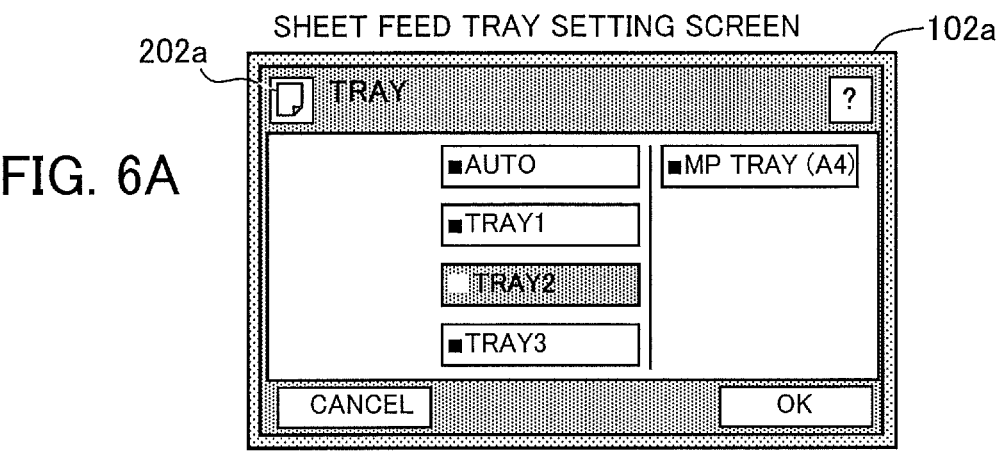
FIG. 6A shows a display example of a sheet feed tray setting screen.
Figure 6B:
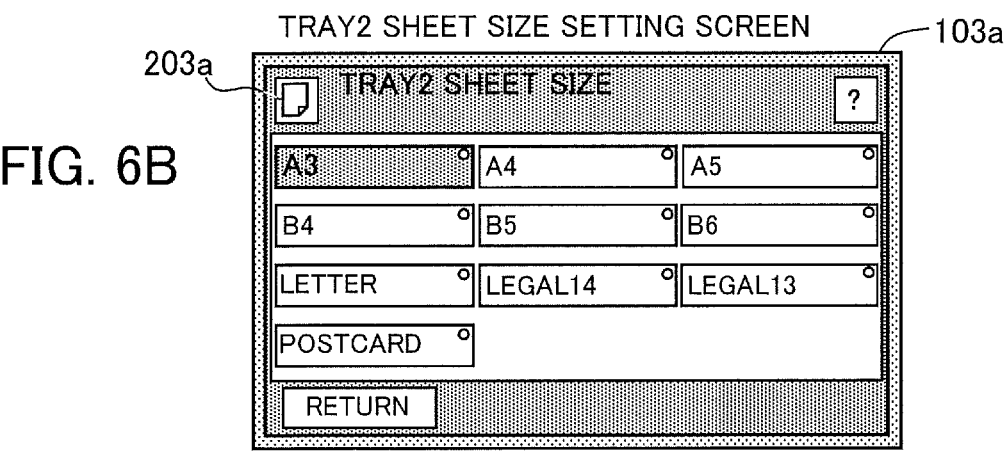
FIG. 6B shows a display example of a TRAY2 sheet size setting screen.
Figure 6C:
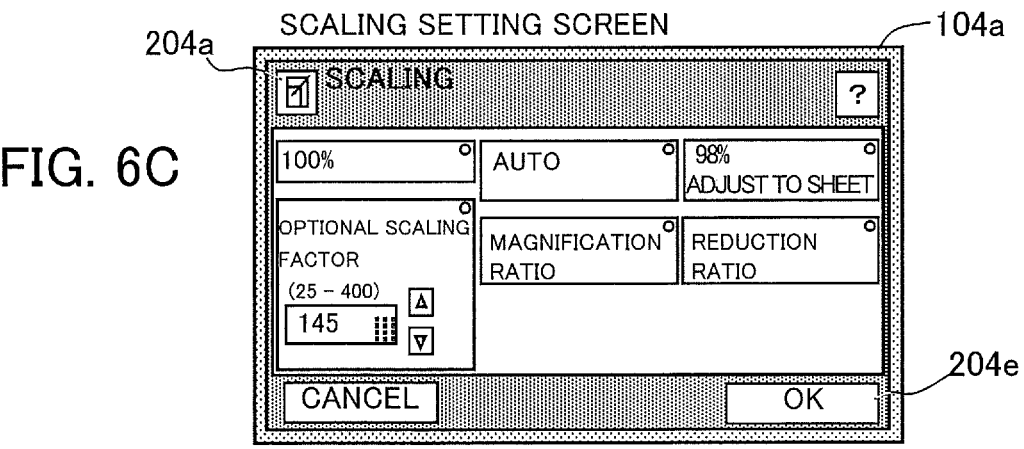
FIG. 6C shows a display example of a scaling setting screen.

FIG. 5 is an explanatory diagram showing the contents of registered setting information stored in the setting information storage unit 16 while being grouped with indices. FIG. 6A shows a display example of the sheet feed tray setting screen 102a, FIG. 6B shows a display example of the TRAY2 sheet size setting screen 103a, and FIG. 6C shows a display example of the scaling setting screen 104a.

In an index No. 1, the function name "copy" of the function as an object, setting items corresponding to the function name "copy", and a setting change flow are stored while being associated with each other as setting information whose setting information registration name is named "special copy". Incidentally, the setting change flow in this example is shown schematically for the sake of simplicity and the screens shown in this example correspond to the contents of screens shown in FIG. 8A, FIG. 8B, FIG. 8C and FIG. 28.

The setting change designation unit 17 includes the setting change screen queue 17a for temporarily storing the data of setting change screens, and has a function of storing setting screen information, including a received function name and setting change screen data as a set of information, in the setting change screen queue 17a when an insertion request to the queue is received from the display control unit 14. Incidentally, the insertion request to the queue occurs when an icon button 202a on the sheet feed tray setting screen 102a shown in FIG. 6A, an icon button 203a on the TRAY2 sheet size setting screen 103a shown in FIG. 6B, or an icon button 204a on the scaling setting screen 104a shown in FIG. 6C is depressed, for example.

The setting information retrieval unit 18 has a function of acquiring setting information, as the object of calling up, from the setting information storage unit 16 and passing on the acquired setting information to the display control unit 14 when a command for calling up setting information is received from the display control unit 14.

Figure 7:
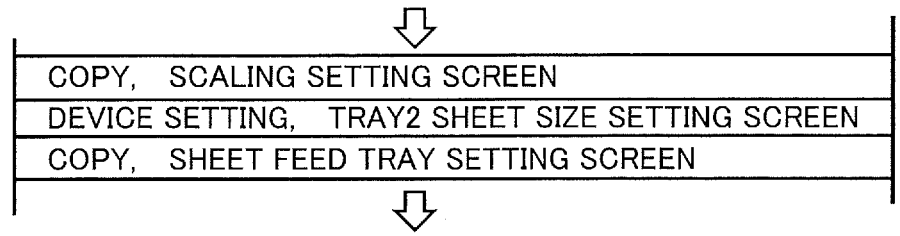
FIG. 7 is an operation diagram showing the order of acquisition of setting screen information acquired from a setting change screen queue when a setting change flow is generated.

The setting change flow generation unit 19 has a function of successively acquiring setting screen information piece by piece as shown in FIG. 7, e.g., in the order of
the sheet feed tray setting screen 102a (FIG. 6A),
the TRAY2 sheet size setting screen 103a (FIG. 6B), and
the scaling setting screen 104a (FIG. 6C)
in this example, from the setting change screen queue 17a of the setting change designation unit 17 and thereby forming a setting change flow for generating setting screens in the wizard format as will be explained later when a request for generating the setting change flow in the wizard format is received from the display control unit 14.

Figure 8A:
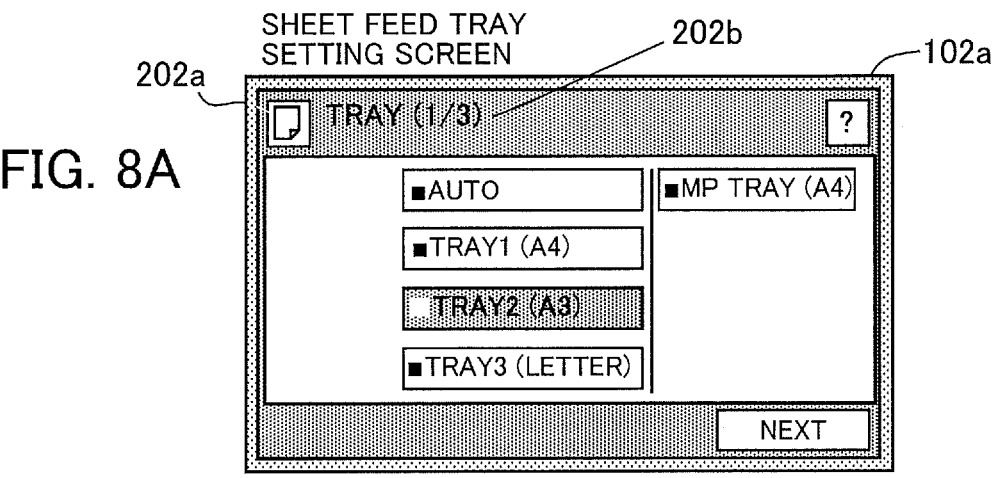
Figure 8B:
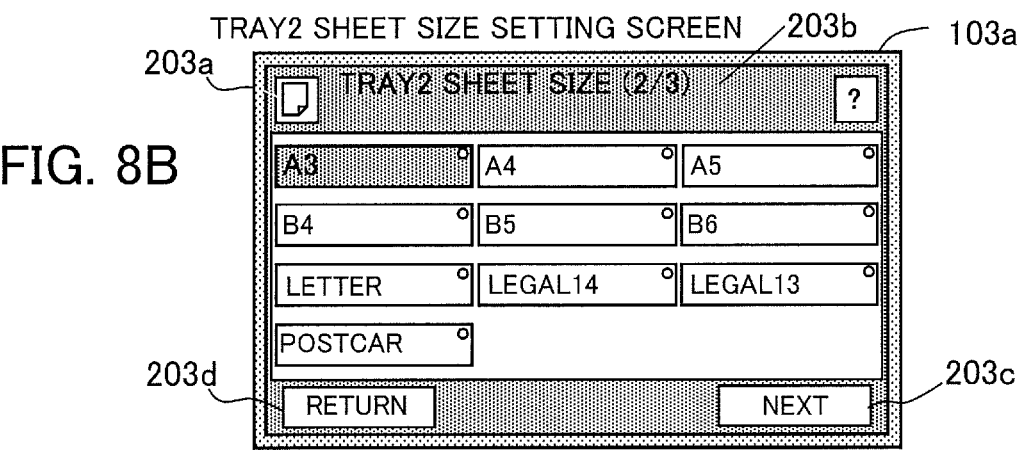
Figure 8C:
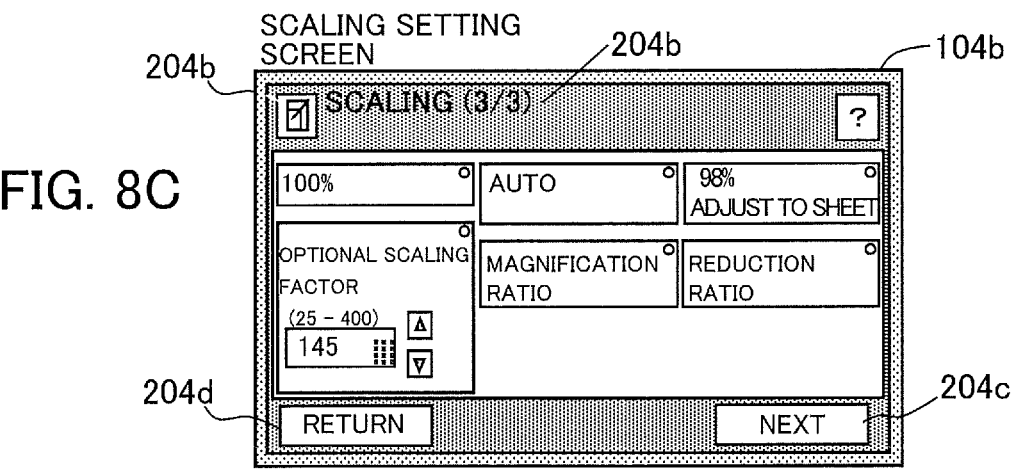

FIGS. 8A to 8C are diagrams showing examples of setting screens generated according to the setting change flow as will be described later. FIG. 8A shows a sheet feed tray setting screen 102b as the first page, FIG. 8B shows a TRAY2 sheet size setting screen 103b as the second page, and FIG. 8C shows a scaling setting screen 104b as the third page.

As shown in FIG. 8A, on the sheet feed tray setting screen 102b as the first page, a "next" button 202c (e.g., only a "next" button 202c) is arranged as a button in an operation area, and the title is provided with a page display (1/3) 202b including a page number "1/3". In contrast, as shown in FIG. 8B, on the TRAY2 sheet size setting screen 103b as the second page, a "next" button 203c and a "return" button 203d are arranged as buttons in the operation area, and the title is provided with a page display (2/3) 203b. Further, as shown in FIG. 8C, on the scaling setting screen 104b as the third page, a "next" button 204c and a "return" button 204d are arranged as buttons in the operation area, and the title is provided with a page display (3/3) 204b.

Figure 9:
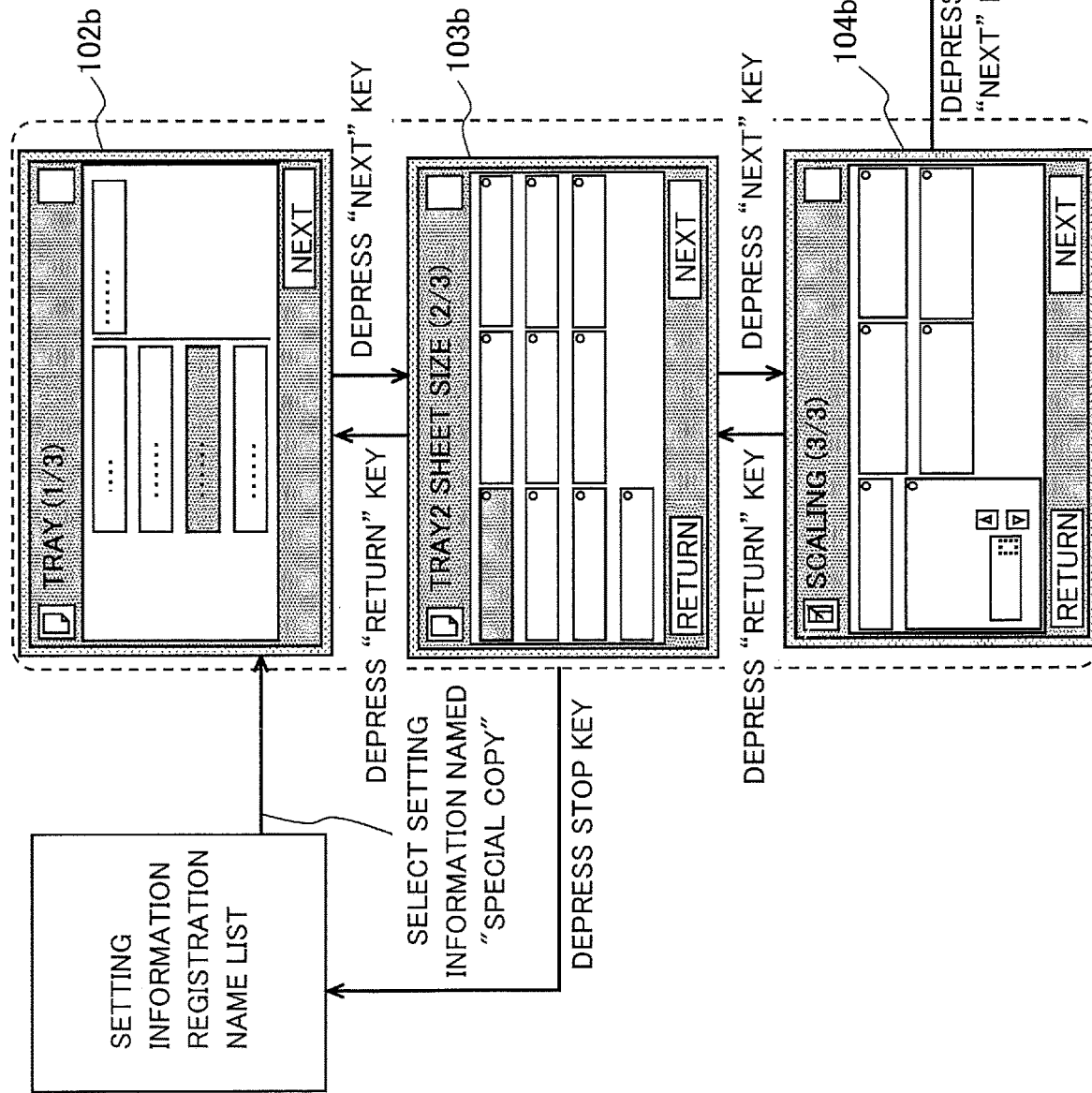
FIG. 9 is an operation diagram showing the flow of transition of setting screens according to a setting change flow included in setting information having a setting information registration name "special copy"

FIG. 9 is an operation diagram showing the flow of transition of setting screens according to a setting change flow included in setting information having a setting information registration name "special copy".

The setting change flow generation unit 19 generates a setting change flow for executing a macro. For example, when a setting information registration name "special copy" is selected from a setting information registration name list (corresponding to a list of setting information registration names displayed on a setting information registration name list screen 113 in FIG. 30 which will be explained later) as shown in FIG. 9, the setting change flow generation unit 19 generates a setting change flow in which screen transition occurs among the sheet feed tray setting screen 102b, the TRAY2 sheet size setting screen 103b, the scaling setting screen 104b and the copy standby screen 101c according to the selection of the "next" button or the "return" button arranged in the operation area of each screen explained with reference to FIGS. 8A to 8C, and stores the generated setting change flow in the setting information storage unit 16 in response to a registration request received from the display control unit 14.

Operations of setting change, setting information registration, setting information retrieval, and macro execution according to a setting change flow, performed by the image forming apparatus 1 according to the present invention in the above-described configuration, will be described below.

Figure 10:
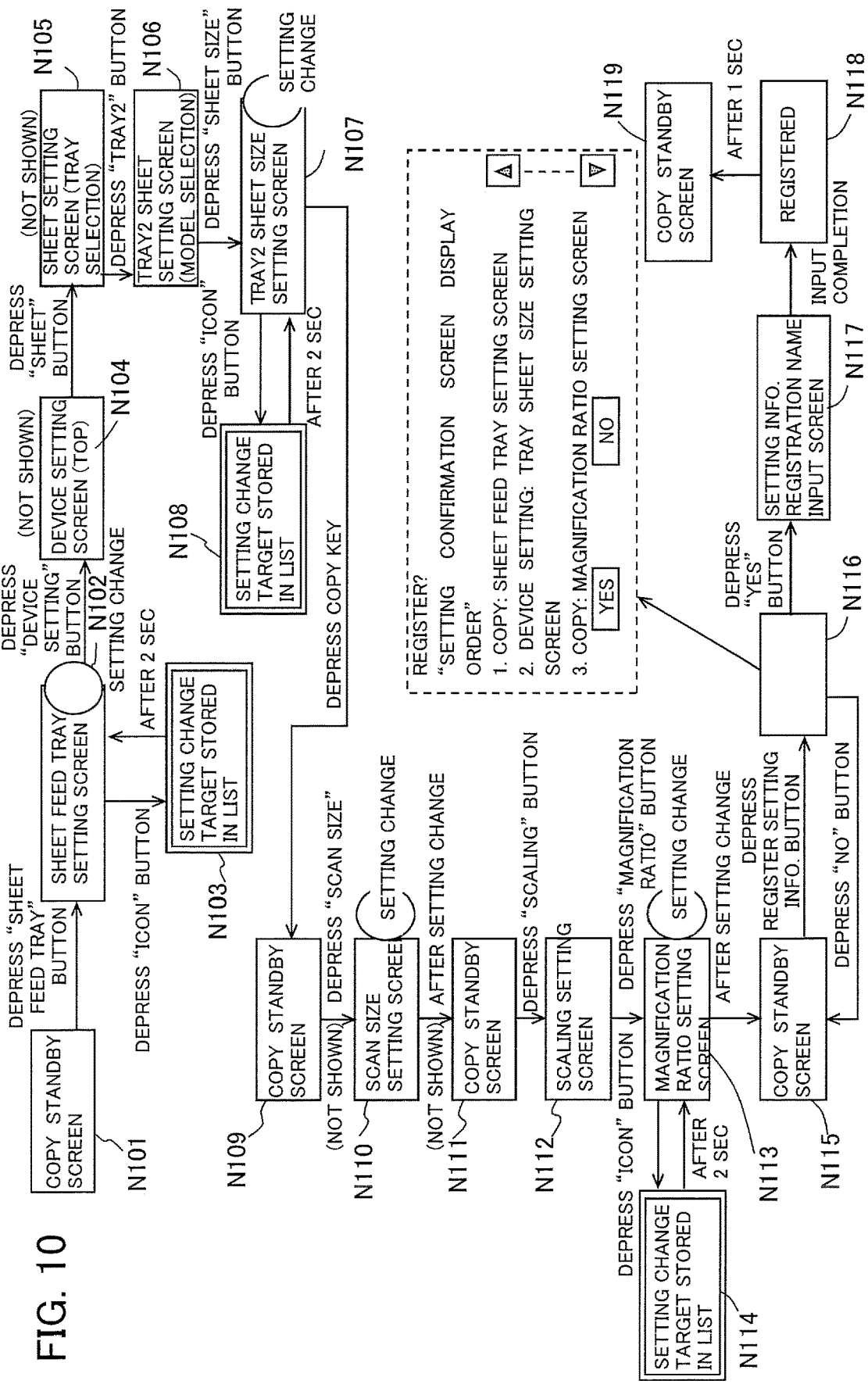
FIG. 10 is a display transition diagram schematically showing a transition process of display screens according to operations from setting change to setting information registration in a case where a plurality of not automatically detectable documents arranged on a scan region (glass surface) of A4 size are scanned and the scanned image is printed on recording paper of A3 size at a magnification ratio of 145%.

FIG. 10 is a display transition diagram schematically showing a transition process of display screens according to operations from the setting change to the setting information registration in a case where the scanning unit 20 (FIG. 1) scans a plurality of not automatically detectable documents arranged on a scan region (glass surface) of A4 size and the scanned image is printed on recording paper of A3 size at a magnification ratio of 145% (not a fixed scaling factor).

Figure 11:
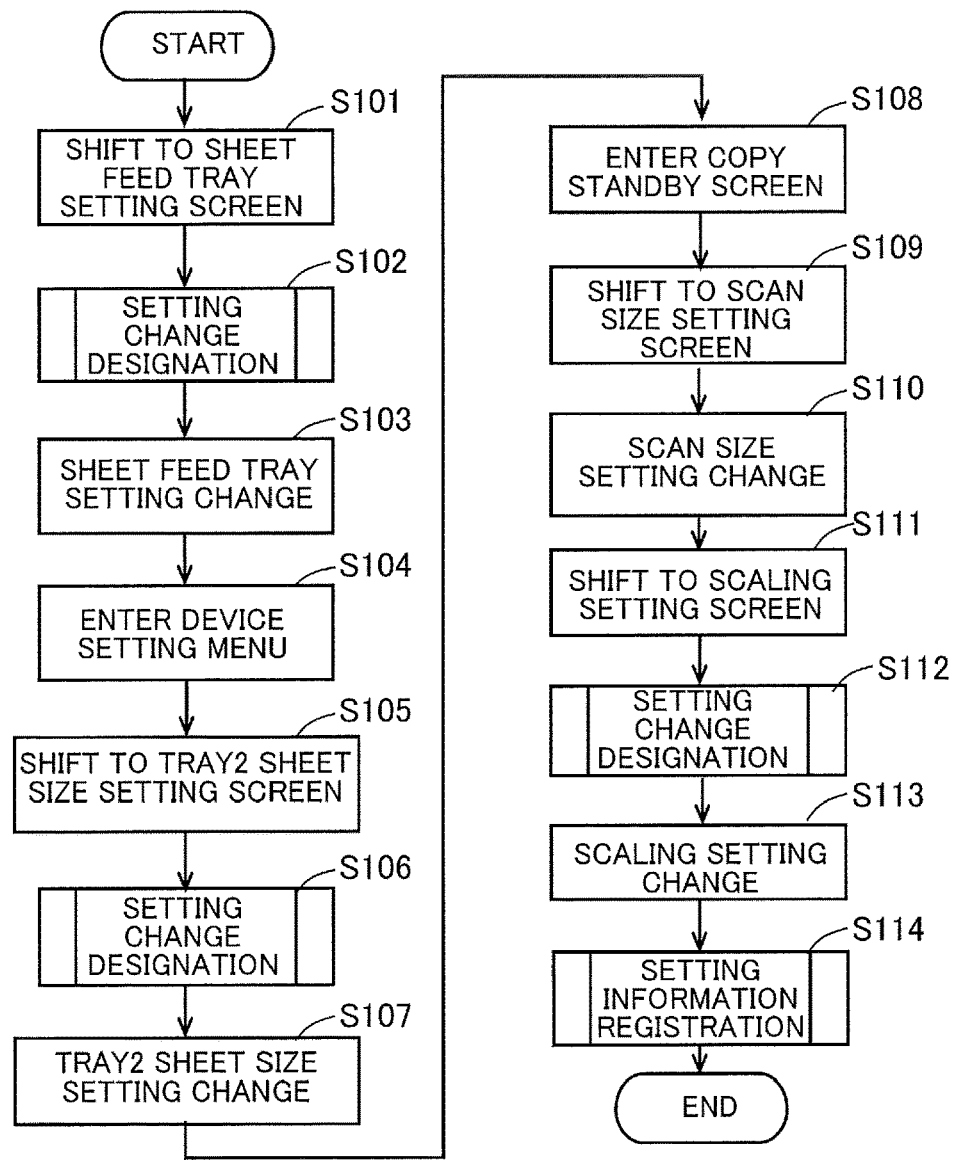
FIG. 11 is a flowchart showing the flow of processing from the setting change to the setting information registration.
Figure 12:
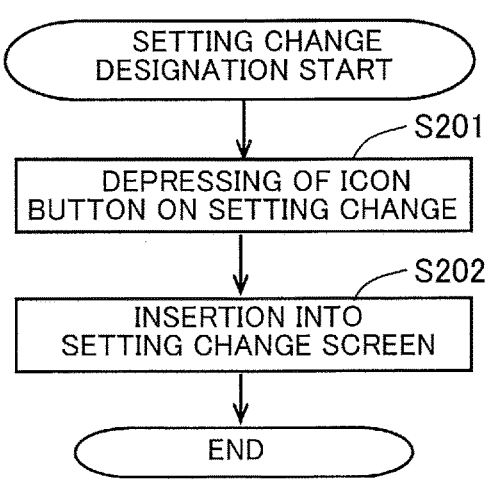
FIG. 12 is a flowchart showing details of a setting change designation process (steps S102, S106 and S112) in the flowchart shown in FIG. 11.
Figure 13:
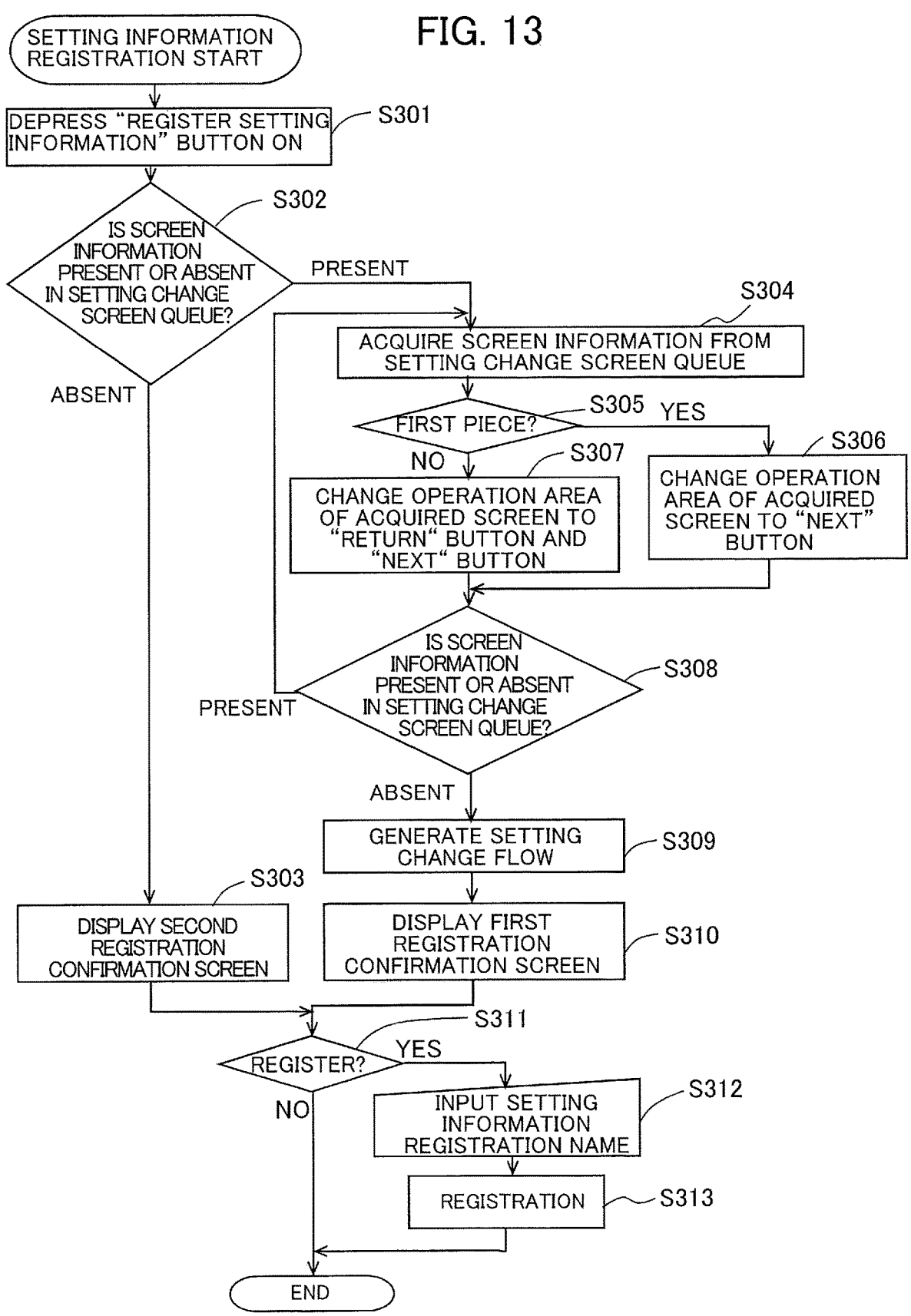
FIG. 13 is a flowchart showing details of a setting information registration process (step S114) in the flowchart shown in FIG. 11.

FIG. 11 is a flowchart showing the flow of processing from the setting change to the setting information registration in this case, FIG. 12 is a flowchart showing details of a setting change designation process (steps S102, S106 and S112) in the flowchart shown in FIG. 11, and FIG. 13 is a flowchart showing details of a setting information registration process (step S114) in the flowchart shown in FIG. 11.

Figure 14:
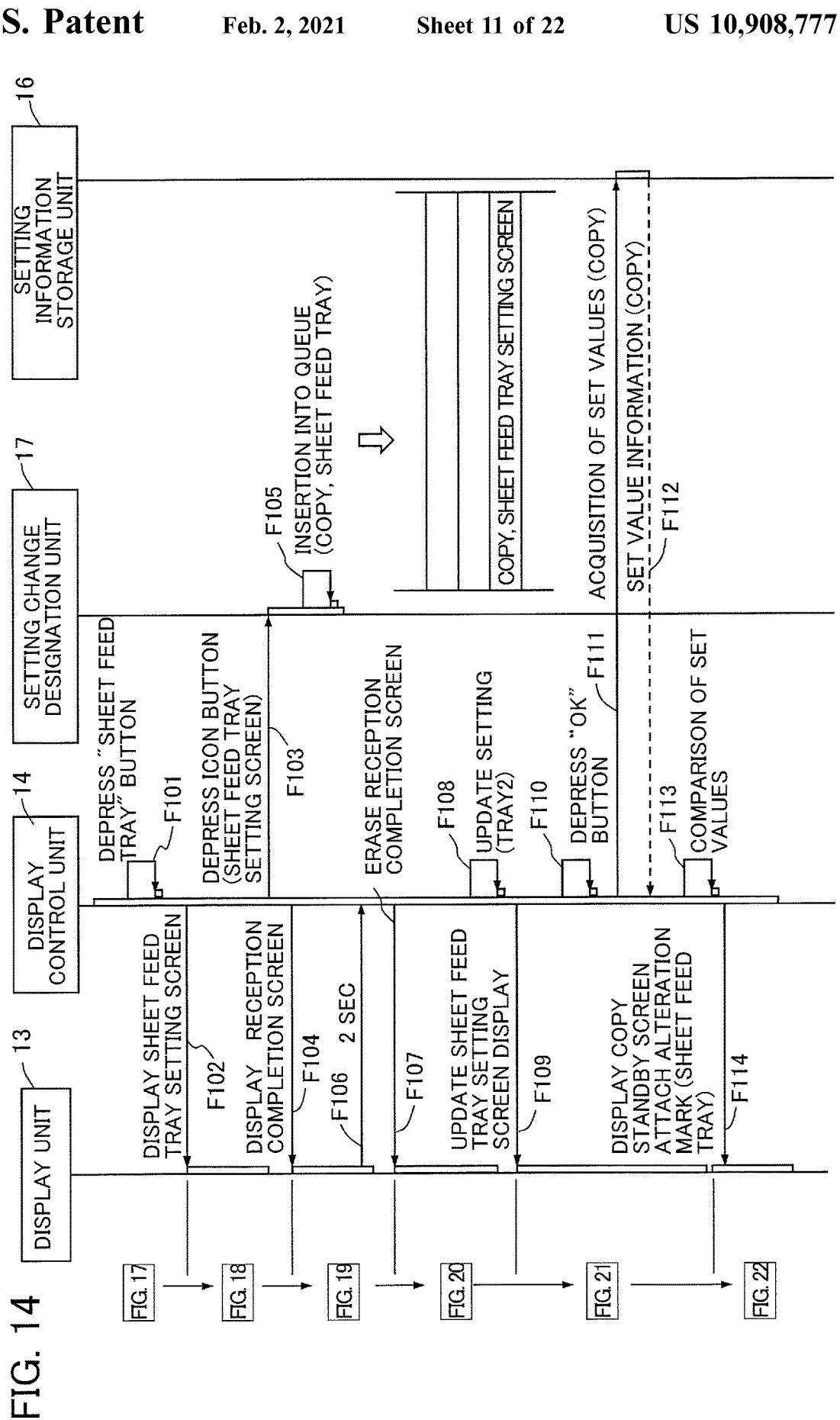
FIG. 14 is a sequence diagram showing the flow of signals among a display unit, a display control unit, a setting change designation unit and the setting information storage unit and display conditions of the display unit at the time of the setting change.
Figure 15:
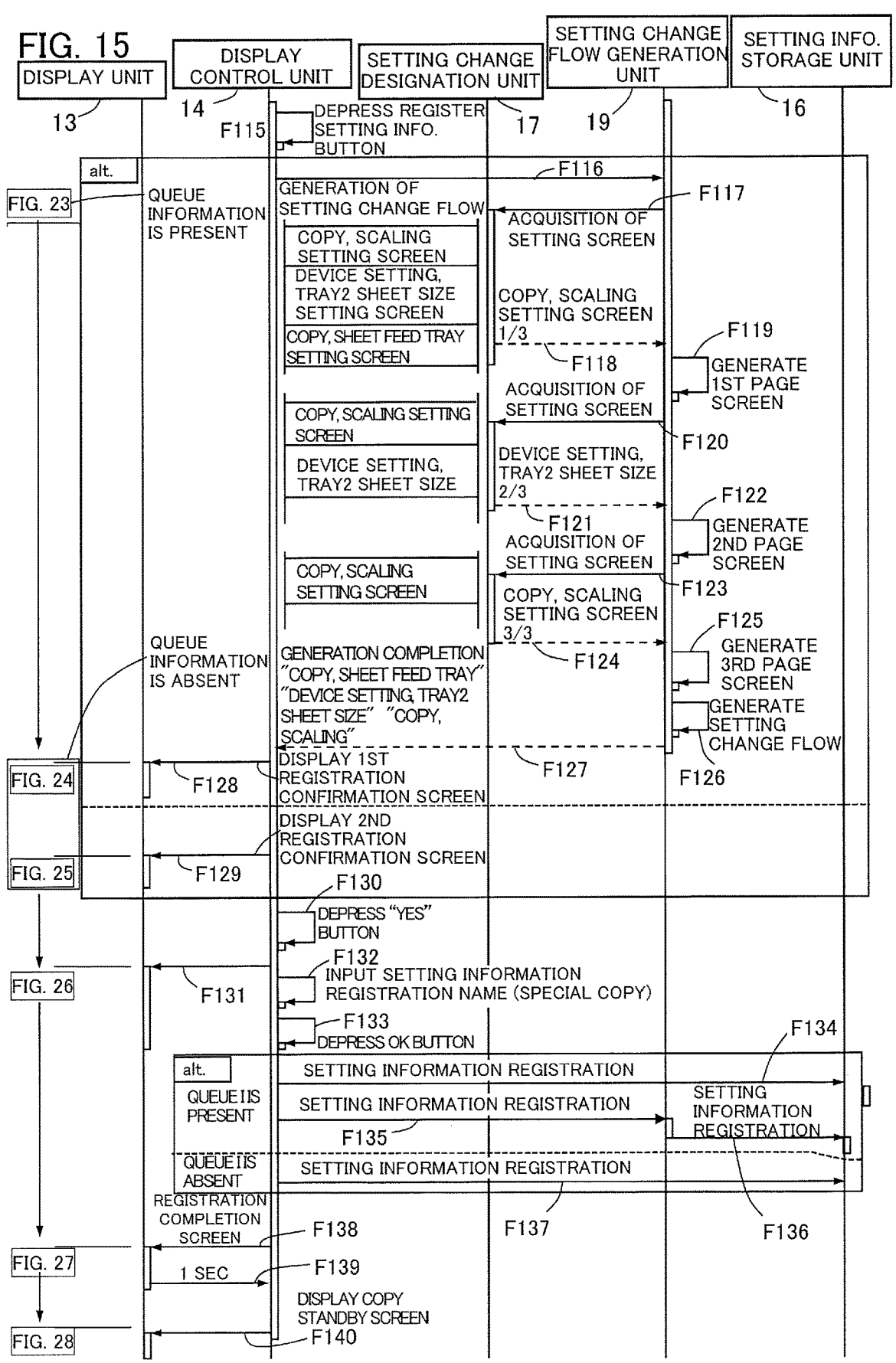
FIG. 15 is a sequence diagram showing the flow of signals among the display unit, the display control unit, the setting change designation unit, the setting information storage unit and a setting change flow generation unit and display conditions of the display unit at the time of the setting information registration.

FIG. 14 is a sequence diagram showing the flow of signals among the display unit 13, the display control unit 14, the setting change designation unit 17 and the setting information storage unit 16 and display conditions of the display unit 13 at the time of the setting change. FIG. 15 is a sequence diagram showing the flow of signals among the display unit 13, the display control unit 14, the setting change designation unit 17, the setting information storage unit 16 and the setting change flow generation unit 19 and display conditions of the display unit 13 at the time of the setting information registration.

Figure 18:
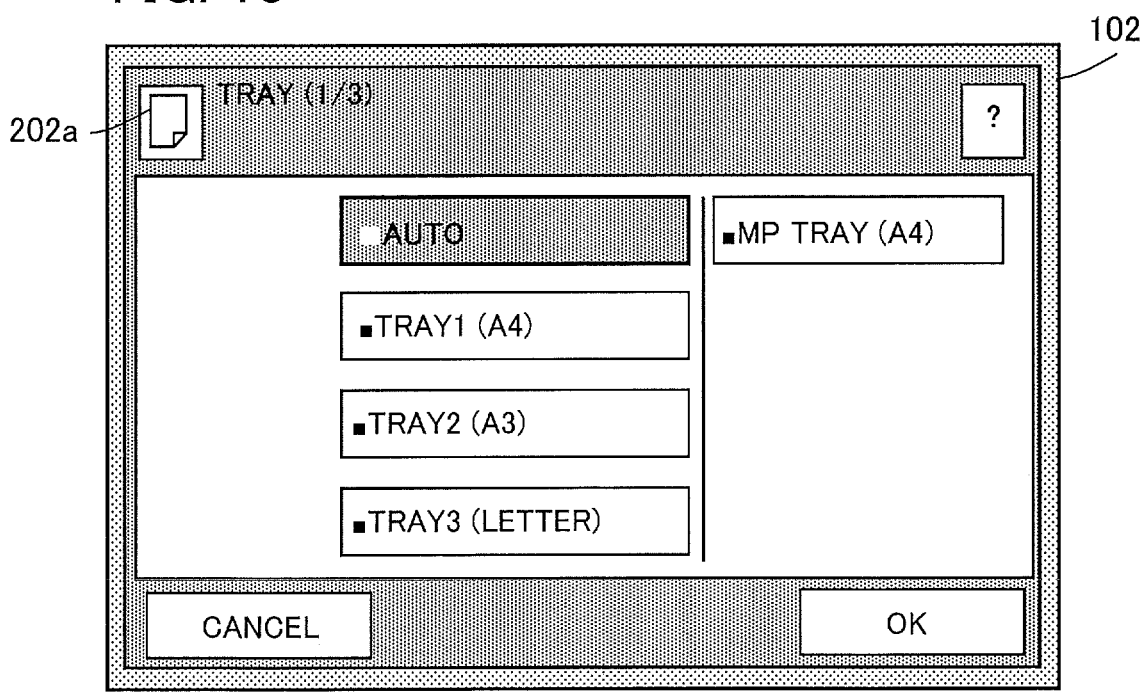
FIG. 18 is a screen diagram showing a display example of the sheet feed tray setting screen displayed on the touch panel.

In the sequence diagrams of FIG. 14 and FIG. 15, a display screen displayed by the display unit 13 at each time is represented by a figure number (FIG. 17, FIG. 18, etc.), which means that a screen shown in the figure having the figure number is displayed.

First, the setting change operation will be described below based on the flowcharts of FIG. 11 and FIG. 12 and with reference to the display transition diagram (FIG. 10) and the sequence diagram (FIG. 14).

Step S101: when a "sheet feed tray" button 201b is depressed (FIG. 14, F101) while the copy standby screen 101 (FIG. 17) is displayed on the display unit 13 due to the depressing of the copy key 15b of the operation panel 11 shown in FIG. 2, the display control unit 14 makes the display unit 13 display a sheet feed tray setting screen 102 (FIG. 18) (FIG. 14, F102).

Figure 19:
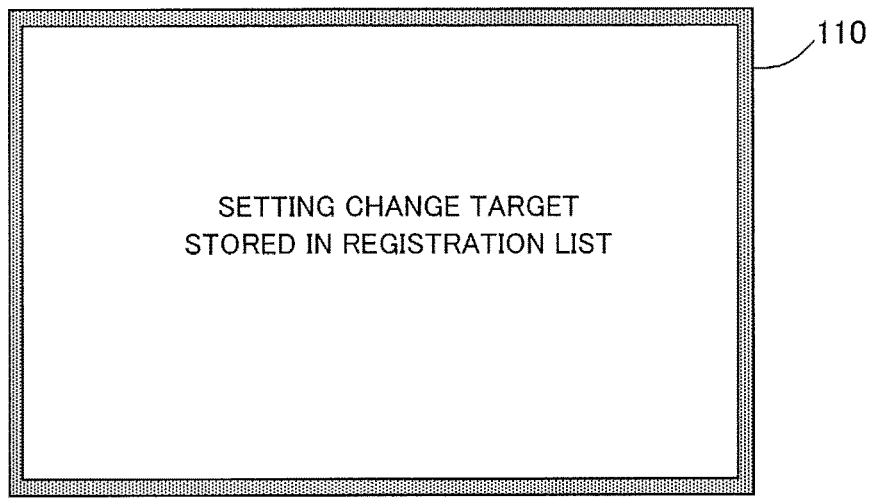
FIG. 19 is a screen diagram showing a display example of a reception completion screen displayed on the touch panel.
Figure 20:
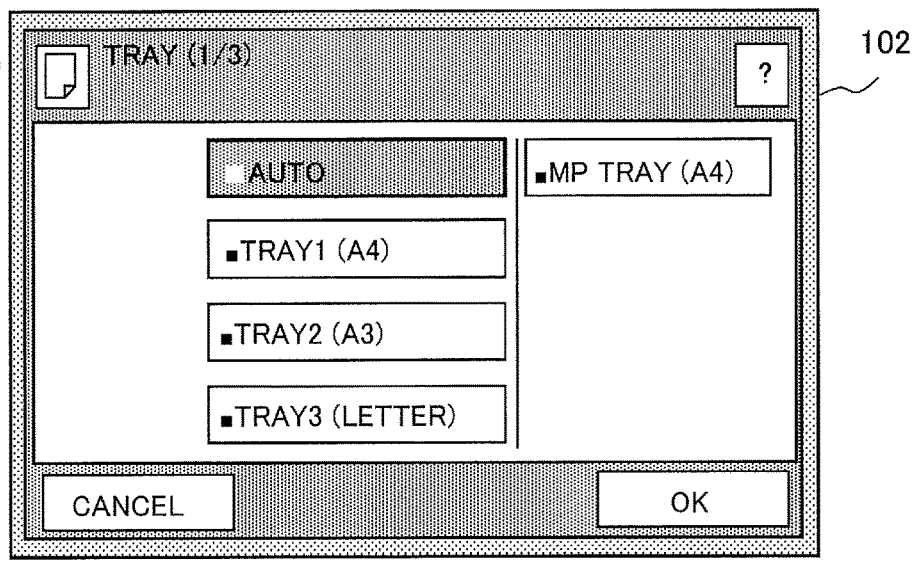
FIG. 20 is a screen diagram showing a display example of the sheet feed tray setting screen displayed on the touch panel.

In step S102 (setting change designation):

Step S201 (FIG. 12): when the depressing of the icon button 202a on the sheet feed tray setting screen 102 (FIG. 18) as a first screen undergoing the setting change designation is reported to the setting change designation unit 17 (FIG. 14, F103), the display control unit 14 makes the display unit 13 display a reception completion screen 110 (FIG. 19) (FIG. 14, F104), and after two seconds (FIG. 14, F106), erases the reception completion screen 110 (FIG. 19) displayed on the display unit 13 (FIG. 14, F107), by which the sheet feed tray setting screen 102 (FIG. 20) is displayed again on the display unit 13.

Step S202: meanwhile, the setting change designation unit 17 receives the insertion request to the queue made by depressing the icon button 202a, and stores setting screen information, including the setting change screen data and the function name (copy in this example) of the sheet feed tray setting screen 102 (FIG. 18) of the copy function as a set of information, in the setting change screen queue 17a (FIG. 1) (FIG. 14, F105).

Figure 21:
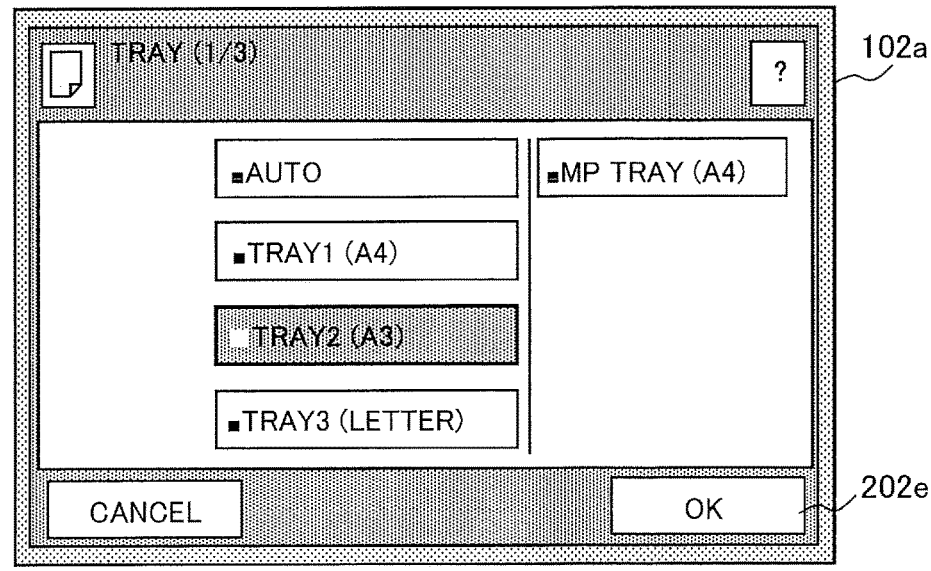
FIG. 21 is a screen diagram showing a display example of the sheet feed tray setting screen displayed on the touch panel.

Step S103: when a set value on the sheet feed tray setting screen 102 (FIG. 20) is changed from the default value (see Table 1) "automatic" to "TRAY2" as a first set value by depressing a button (FIG. 14, F108), the sheet feed tray setting screen 102 displayed on the display unit 13 is updated to a changed sheet feed tray setting screen 102a (FIG. 21) (FIG. 14, F109).

Thereafter, when an "OK" button 202e on the sheet feed tray setting screen 102a is depressed (FIG. 14, F110), the display control unit 14 acquires the default set values of the setting items of the copy function from the setting information storage unit 16 (FIG. 14, F111, F112), compares the default set values with the set values temporarily stored in the display control unit 14, identifies each setting item differing from the default value (FIG. 14, F113), and updates the copy standby screen 101 (FIG. 17) to a copy standby screen 101a (FIG. 22) in which the "sheet feed tray" button 201b corresponding to a setting display part for the identified setting item (sheet feed tray) is provided with the alteration mark 201d (FIG. 14, F114).

Incidentally, the flow of the steps S101 to S103 corresponds to processing in transition numbers N101 to N103 in the display transition diagram of FIG. 10.

Steps S104 to S107 are steps in which a TRAY2 sheet size setting screen 103 is displayed (see FIG. 6B), setting screen information including the setting change screen data and the function name of the TRAY2 sheet size setting screen 103 as a first screen of a device setting function as a set of information is stored in the setting change screen queue 17a (FIG. 1) due to the depressing of the icon button 203a, and the set value is changed from "A4" to "A3". The steps S104 to S107 correspond to processing in transition numbers N102 to N108 in the display transition diagram of FIG. 10; however, the sequence diagram is omitted here since the sequence regarding the setting change is similar to that at the time of the setting change of the sheet feed tray in the steps S101 to S103 explained above.

Incidentally, while a state in which the sheet size has been set at A3 is shown in the TRAY2 sheet size setting screen 103a in FIG. 6B, the TRAY2 sheet size setting screen 103 mentioned here corresponds to a screen in which the sheet size has been set at the default value (see Table 1) A4.

Figure 22:
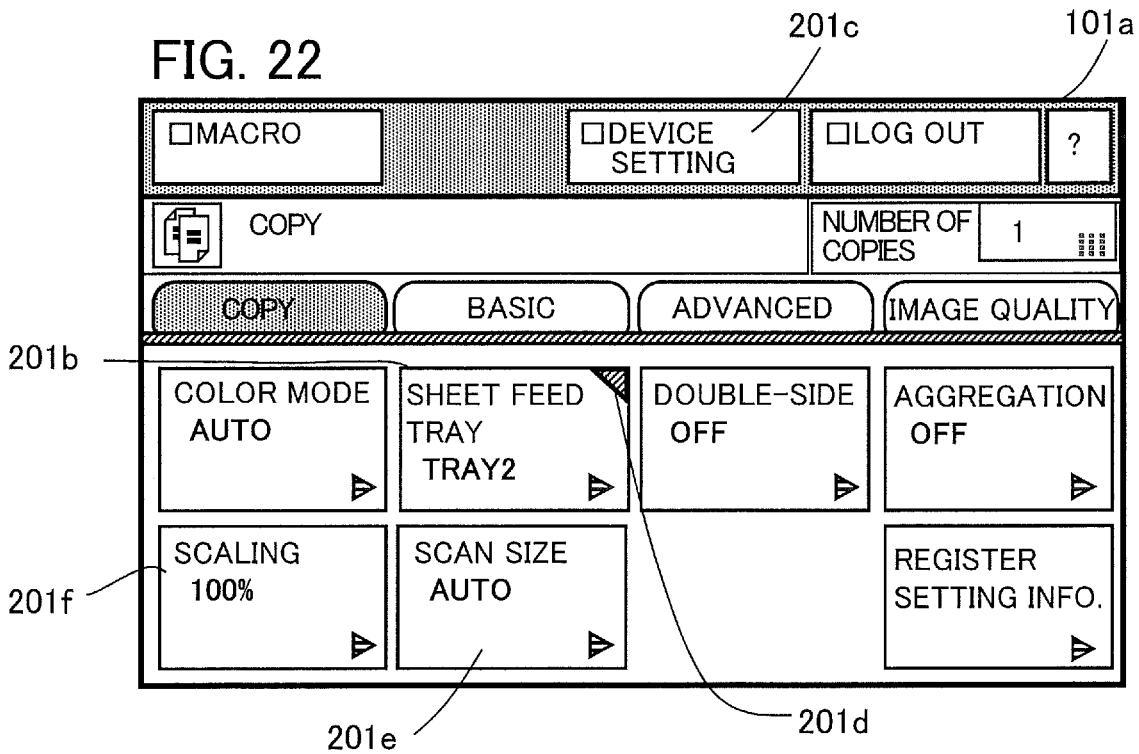
FIG. 22 is a screen diagram showing a display example of the copy standby screen displayed on the touch panel.

Step S104: the user enters a device setting menu by depressing a "device setting" button 201c arranged at the top of the copy standby screen 101a (FIG. 22).

Step S105: the TRAY2 sheet size setting screen 103 is displayed from the device setting menu. Meanwhile, button depression processes of transition numbers N104 to N106 in the display transition diagram of FIG. 10 are executed.

Incidentally, the "device setting" button 201c is provided in order to display setting items related to every function, such as the setting of the sheet size in each tray, and to set the set values, and is displayed in common in the standby screen of each function.

In step S106 (setting change designation):

Step S201: when the depressing of the icon button 203a on the TRAY2 sheet size setting screen 103 (see FIG. 6B) is reported to the setting change designation unit 17, the display control unit 14 makes the display unit 13 display the reception completion screen 110 (FIG. 19), and after two seconds, erases the reception completion screen 110 (FIG. 19) displayed on the display unit 13, by which the TRAY2 sheet size setting screen 103 is displayed again on the display unit 13.

Step S202: meanwhile, the setting change designation unit 17 receives the insertion request to the queue made by depressing the icon button 203a, and stores setting screen information, including the setting change screen data and the function name (device setting in this example) of the TRAY2 sheet size setting screen 103 (see FIG. 6B) of the device setting function as a set of information, in the setting change screen queue 17a (FIG. 1).

Step S107: the set value on the TRAY2 sheet size setting screen 103 is changed from the default value "A4" to "A3" and the TRAY2 sheet size setting screen 103 displayed on the display unit 13 is updated to a changed TRAY2 sheet size setting screen 103a (FIG. 6B). Incidentally, the process of displaying the alteration mark is not executed here since the device setting function is not a function that carries out a job.

Step S108: the screen returns again to the copy standby screen 101a (FIG. 22) due to the depressing of the copy key 15b (FIG. 2).

Steps S109 and S110 are steps in which a scan size setting screen (not shown) is displayed and the set value is changed from the default value "automatic" (see Table 1) to "A4". The steps S109 and S110 correspond to processing in transition numbers N109 to N111 in the display transition diagram of FIG. 10; however, the sequence diagram is omitted here since the sequence regarding the setting change is similar to that at the time of the setting change of the sheet feed tray in the steps S101 to S103 explained earlier.

Step S109: a "scan size" button 201e (FIG. 22) is depressed and the scan size setting screen (not shown) is displayed.

Step S110: when the set value on the scan size setting screen is changed from the default value "automatic" to "A4" as a second set value, the display of the scan size setting screen on the display unit 13 is updated.

Figure 36:
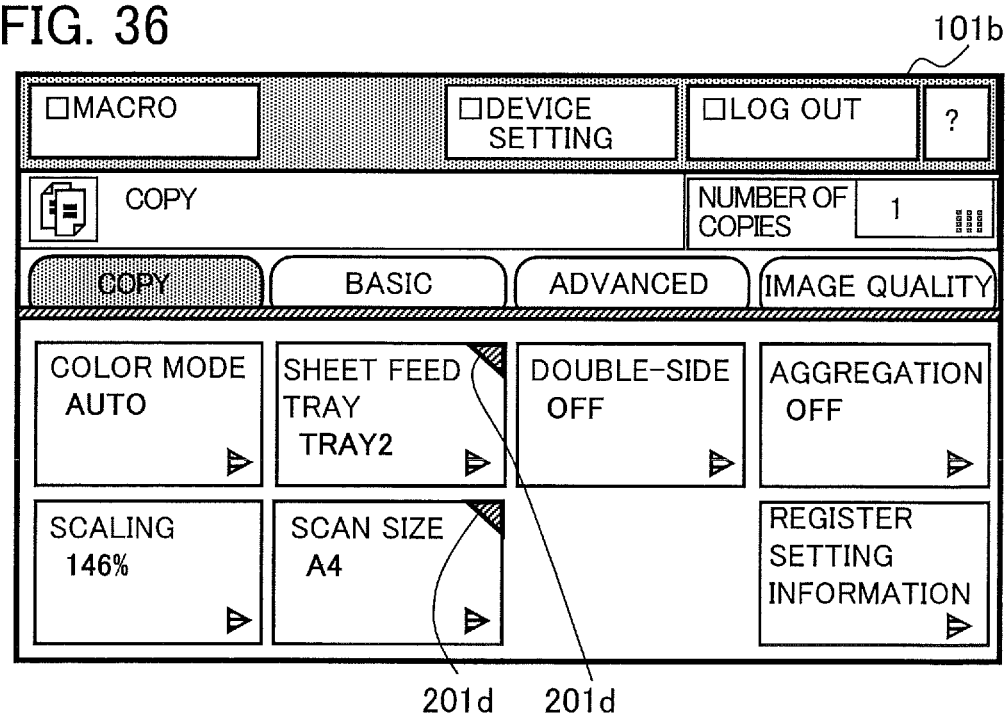
FIG. 36 is a screen diagram showing a display example of the copy standby screen displayed on the touch panel.

Thereafter, when the "OK" button on the scan size setting screen is depressed, the display control unit 14 acquires the default set values of the setting items of the copy function from the setting information storage unit 16, compares the default set values with the set values temporarily stored in the display control unit 14, identifies each setting item differing from the default value, and updates the copy standby screen 101a (FIG. 22) to a copy standby screen 101b (FIG. 36) in which the button of the identified setting item (scan size) is provided with the alteration mark 201d.

Incidentally, the scan size setting screen, not undergoing the setting change designation, corresponds to a second screen not handled as a target of recalling.

Steps S111 to S113 are steps in which a scaling setting screen 104 (see FIG. 6C) of the copy function is displayed, setting screen information including the setting change screen data and the function name of the scaling setting screen 104 of the copy function as a set of information is stored in the setting change screen queue 17a (FIG. 1) due to the depressing of the icon button 204a, and the set value is changed from "100%" to "145%". The steps S111 to S113 correspond to processing in transition numbers N111 to N115 in the display transition diagram of FIG. 10; however, the sequence diagram is omitted here since the sequence regarding the setting change is similar to that at the time of the setting change of the sheet feed tray in the steps S101 to S103 explained earlier.

Incidentally, while a state in which the scaling factor has been set at "145%" is shown in the scaling setting screen 104a in FIG. 6C, the scaling setting screen 104 mentioned here corresponds to a screen in which the scaling factor has been set at the default value (see Table 1) "100%".

Step S111: when a "scaling" button 201f is depressed while the copy standby screen 101b (FIG. 36) is displayed on the display unit 13, the display control unit 14 makes the display unit 13 display the scaling setting screen 104 (see FIG. 6C).

Incidentally, while a state in which the alteration mark 201d has been provided only on the "sheet feed tray" button 201b is shown in the copy standby screen 101a in FIG. 22, the copy standby screen 101b mentioned here (FIG. 36) corresponds to a screen in which the alteration mark 201d has been provided also on the "scan size" button 201e.

In step S112 (setting change designation):

Step S201: when the depressing of the icon button 204a on the scaling setting screen 104 (see FIG. 6C) is reported to the setting change designation unit 17, the display control unit 14 makes the display unit 13 display the reception completion screen 110 (FIG. 19), and after two seconds, erases the reception completion screen 110 displayed on the display unit 13, by which the scaling setting screen 104 is displayed again on the display unit 13.

Step S202: meanwhile, the setting change designation unit 17 receives the insertion request to the queue made by depressing the icon button 204a, and stores setting screen information, including the setting change screen data and the function name (copy in this example) of the scaling setting screen 104 (see FIG. 6C) of the copy function as a set of information, in the setting change screen queue 17a (FIG. 1).

Step S113: the set value on the scaling setting screen 104 is changed from "100%" to "145%" as a first set value and the scaling setting screen 104 displayed on the display unit 13 is updated to a changed scaling setting screen 104a (FIG. 6C).

Figure 23:
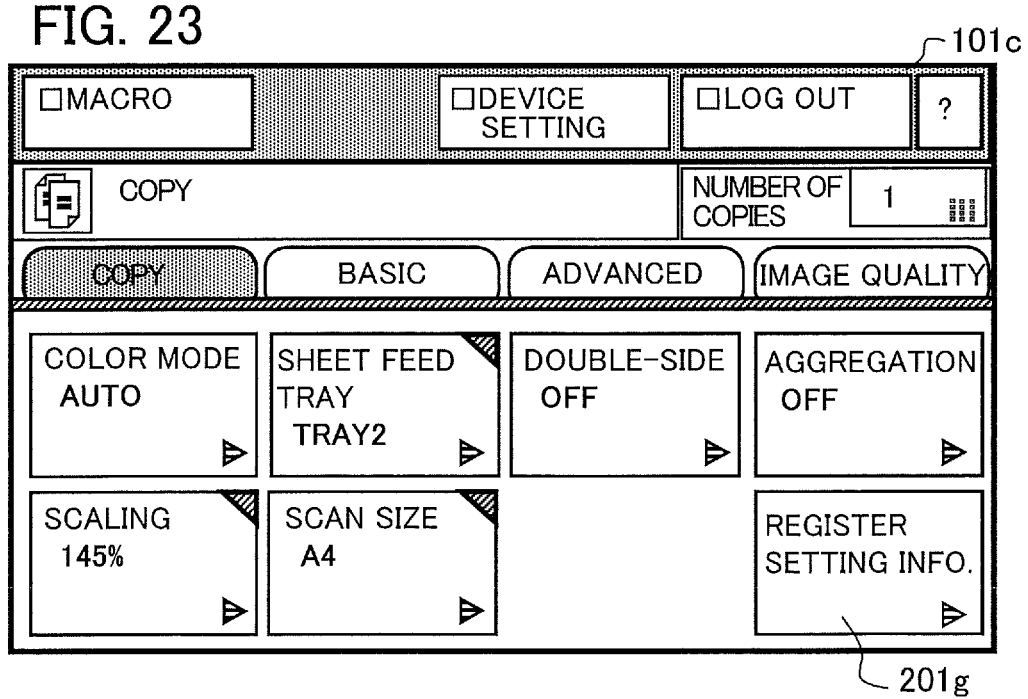
FIG. 23 is a screen diagram showing a display example of the copy standby screen displayed on the touch panel.

Thereafter, when an "OK" button 204e on the scaling setting screen 104a (FIG. 6C) is depressed, the display control unit 14 acquires the default set values of the setting items of the copy function from the setting information storage unit 16, compares the default set values with the set values temporarily stored in the display control unit 14, identifies each setting item differing from the default value, and updates the aforementioned copy standby screen 101b (FIG. 36) to a copy standby screen 101c (FIG. 23) in which the button 201f of the identified setting item (scaling) is provided with the alteration mark 201d.

Next, the setting information registration operation, corresponding to the processing in the step S114 (setting information registration) in the flowchart of FIG. 11, will be described below based on the flowchart of FIG. 13 and with reference to the display transition diagram (FIG. 10) and the sequence diagram (FIG. 15).

Step S301: a "register setting information" button 201g is depressed (FIG. 15, F115) while the copy standby screen 101c (FIG. 23), on which the setting change designation for determining the setting change screens and the setting change for changing set values have been completed by the above-described steps, is displayed on the display unit 13.

Step S302: the display control unit 14 checks whether or not screen information is stored in the setting change screen queue 17a (FIG. 1) of the setting change designation unit 17, and the process advances to step S304 if stored, or advances to step S303 if not stored.

Figure 25:
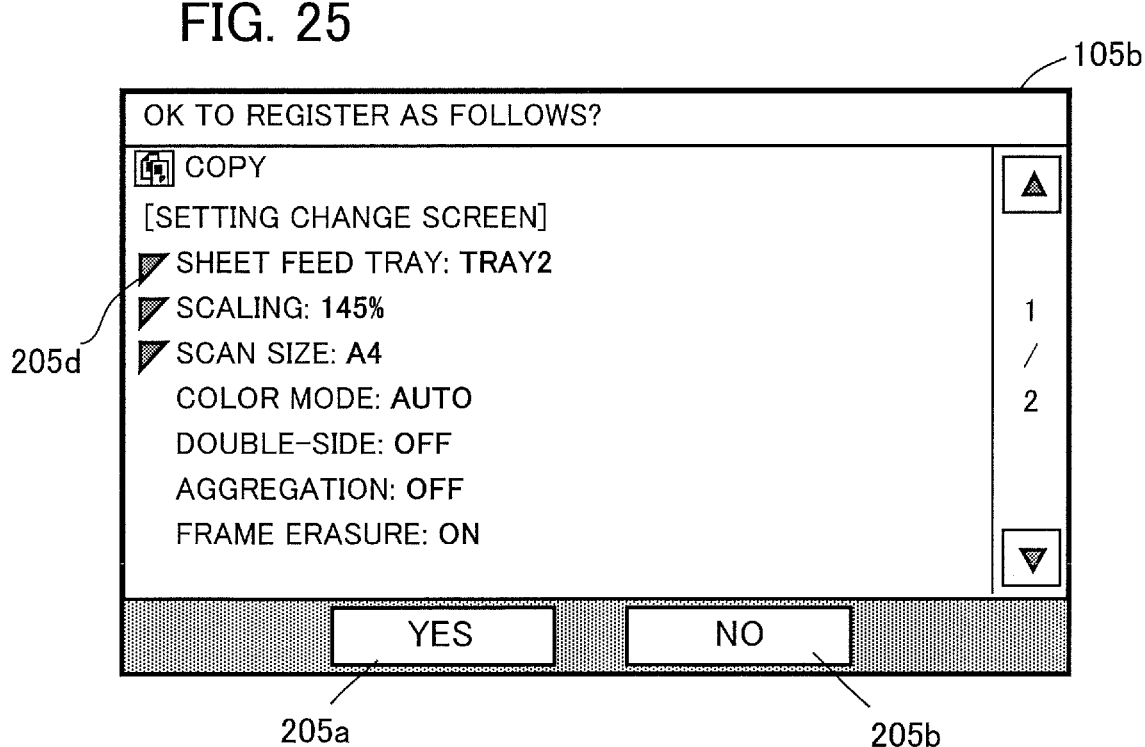
FIG. 25 is a screen diagram showing a display example of the second registration confirmation screen displayed on the touch panel.

Step S303: the display control unit 14 makes the display unit 13 display a second registration confirmation screen 105b (FIG. 25) like the screen shown in FIG. 4B (FIG. 15, F129), and the process advances to step S311. Incidentally, the second registration confirmation screen 105b displayed here is a screen indicating the setting items of the copy function shown in Table 1 and the set values corresponding to the setting items as "copy function set values", wherein each item changed from the default value is provided with the alteration mark 205d and arranged over items remaining at the default values as shown in FIG. 25. Parenthetically, the set value of each item remaining at the default value corresponds to a third set value.

Step S304: the display control unit 14 requests the setting change flow generation unit 19 to generate the setting change flow (FIG. 15, F116), and the setting change flow generation unit 19 successively acquires pieces of setting screen information as temporarily stored first screen information from the setting change screen queue 17a of the setting change designation unit 17 in the aforementioned order indicated by the arrows in FIG. 7 (FIG. 15, F117-F118, F120-F121, F123-F124).

Step S305: the process advances to step S306 if the setting change flow generation unit 19 has just acquired setting screen information as the first page from the setting change screen queue 17a of the setting change designation unit 17, or advances to step S307 if the acquired setting screen information is the second page or later.

Step S306: the setting change flow generation unit 19 generates a first page screen like the screen shown in FIG. 8A, i.e., a sheet feed tray setting screen 102b as a redisplay screen on which the "next" button 202c (e.g., only the "next" button 202c) is arranged in the operation area and the page display 202b "1/3" is added to the title (FIG. 15, F119), and the process advances to step S308.

Step S307: when the setting screen information as the second page is acquired, the setting change flow generation unit 19 generates a second page screen like the screen shown in FIG. 8B, i.e., a TRAY2 sheet size setting screen 103b as a redisplay screen on which the "next" button 203c and the "return" button 203d are arranged in the operation area and the page display 203b "2/3" is added to the title (FIG. 15, F122), and the process advances to the step S308. When the setting screen information as the third page is acquired, the setting change flow generation unit 19 generates a third page screen like the screen shown in FIG. 8C, i.e., a scaling setting screen 104b as a redisplay screen on which the "next" button 204c and the "return" button 204d are arranged in the operation area and the page display 204b "3/3" is added to the title (FIG. 15, F125), and the process advances to the step S308.

Step S308: the setting change flow generation unit 19 checks the presence/absence of setting screen information in the setting change screen queue 17a of the setting change designation unit 17, and the process returns to the step S304 if present, or to step S309 if absent.

Step S309: the setting change flow generation unit 19 generates the setting change flow, as display command information implementing the screen transition explained with reference to FIG. 9, by using those setting screens as the generated redisplay screens (FIG. 15, F126), and notifies the display control unit 14 of the completion of the generation together with the generated three types of screen information (the sheet feed tray setting screen 102b of the copy function, the TRAY2 sheet size setting screen 103b of the device setting function, and the scaling setting screen 104b of the copy function) (FIG. 15, F127).

Figure 24:
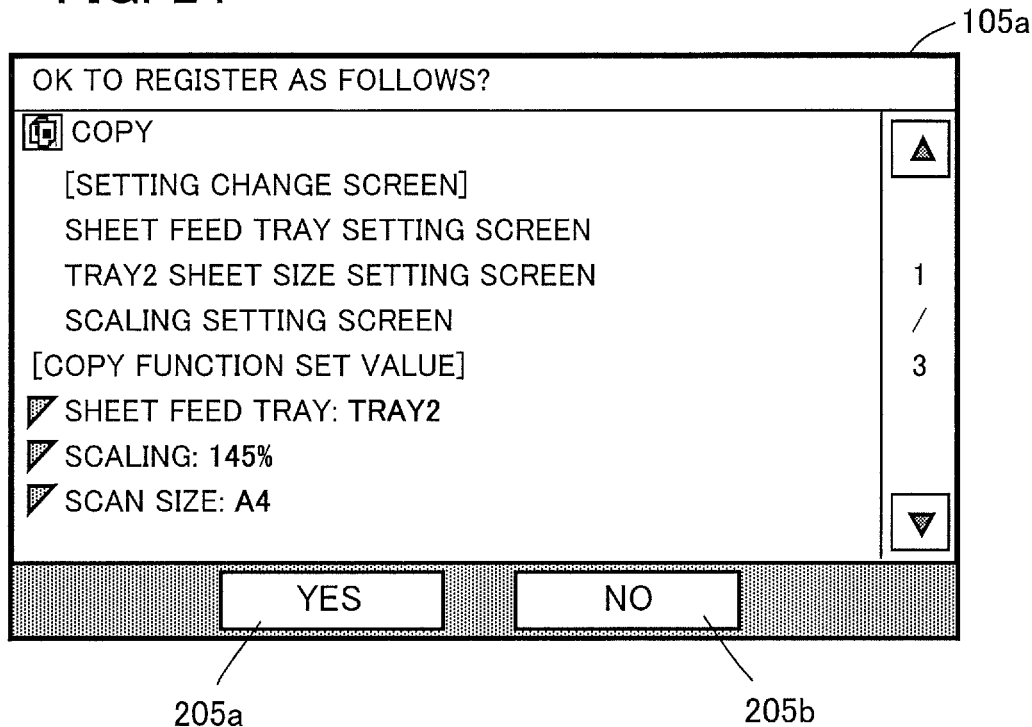
FIG. 24 is a screen diagram showing a display example of the first registration confirmation screen displayed on the touch panel.

Step S310: the display control unit 14 makes the display unit 13 display the first registration confirmation screen 105a (FIG. 24) like the screen shown in FIG. 4A (FIG. 15, F128), and the process advances to step S311. Incidentally, the first registration confirmation screen 105a displayed here indicates the names of the screens appearing in the setting change flow, i.e., the "sheet feed tray setting screen", the "TRAY2 sheet size setting screen" and the "scaling setting screen" in this example, in the section "SETTING CHANGE SCREEN" and indicates the setting items of the copy function shown in Table 1 and the set values corresponding to the setting items in the section "COPY FUNCTION SET VALUE". Parenthetically, the display method in the section "COPY FUNCTION SET VALUE" is the same as the display method in the section "COPY FUNCTION SET VALUE" on the second registration confirmation screen 105b (FIG. 25) described earlier.

Step S311: when a "YES" button 205a for registering is depressed (FIG. 15, F130) according to the judgment on whether to conduct the registration or not made by the user checking the registration confirmation screen (105a or 105b) displayed on the display unit 13, the process advances to step S312. When a "NO" button 205b for not registering is depressed, the series of processing operations is ended at that stage.

Figure 26:
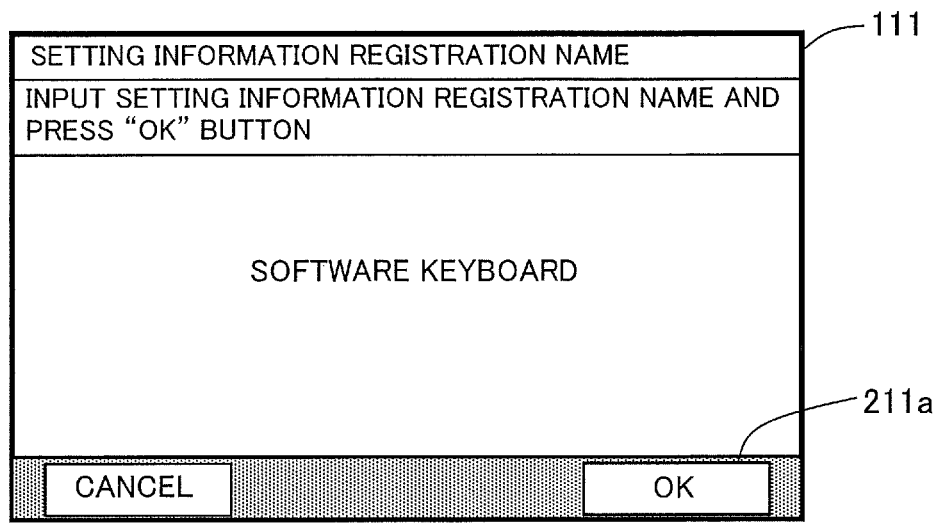
FIG. 26 is a screen diagram showing a display example of a software keyboard screen displayed on the touch panel.

Step S312: the display control unit 14 makes the display unit 13 display a software keyboard screen 111 (FIG. 26) to be used for inputting the setting information registration name (FIG. 15, F131), and the setting information registration name is inputted through the software keyboard screen 111 (FIG. 15, F132). In this example, "special copy" is inputted, for example, as the setting information registration name as a first name.

Step S313: when an "OK" button 211a on the software keyboard screen 111 (FIG. 26) is depressed (FIG. 15, F133), the display control unit 14 stores the set value information after the setting change of the copy function (setting items whose set values have been finalized) in the setting information storage unit 16 while associating the set value information with the setting information registration name "special copy" (FIG. 15, F134).

Further, when a setting change flow has been generated by the setting change flow generation unit 19, the display control unit 14 issues a command for storing the generated setting change flow in the setting information storage unit 16 while attaching the setting information registration name to the command (FIG. 15, F135), and the setting change flow generation unit 19 stores the setting change flow in an area of the setting information storage unit 16 storing the setting information registration name "special copy" (FIG. 15, F136). At this stage, in the setting information storage unit 16, functions, set value information (setting items, set values) and setting change flows are stored as setting information while being grouped with indices in regard to each setting information registration name as explained earlier with reference to FIG. 5.

In contrast, when no setting change flow has been generated, the set value information (e.g., only the set value information) after the setting change of the copy function is stored in the setting information storage unit 16 while associating the set value information with the setting information registration name "special copy" (FIG. 15, F137).

Figure 27:
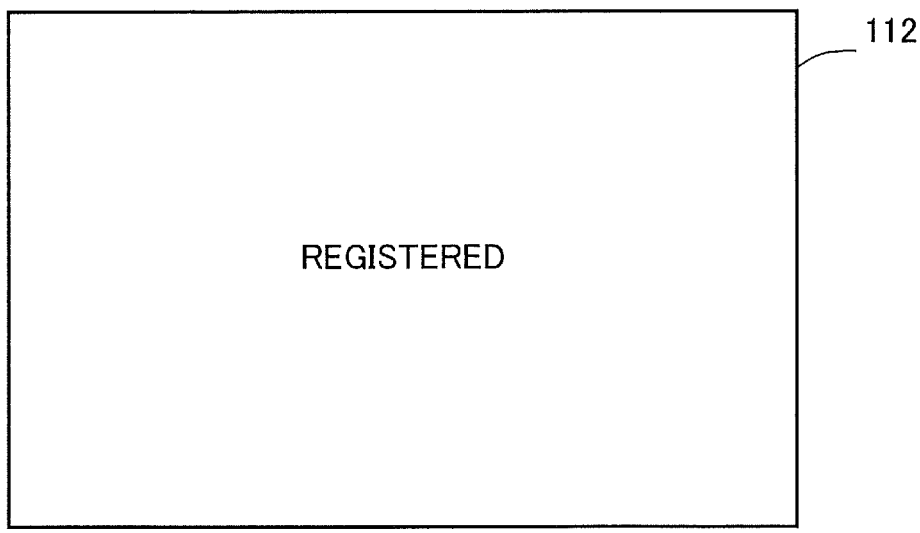
FIG. 27 is a screen diagram showing a display example of a registration completion screen displayed on the touch panel.
Figure 28:
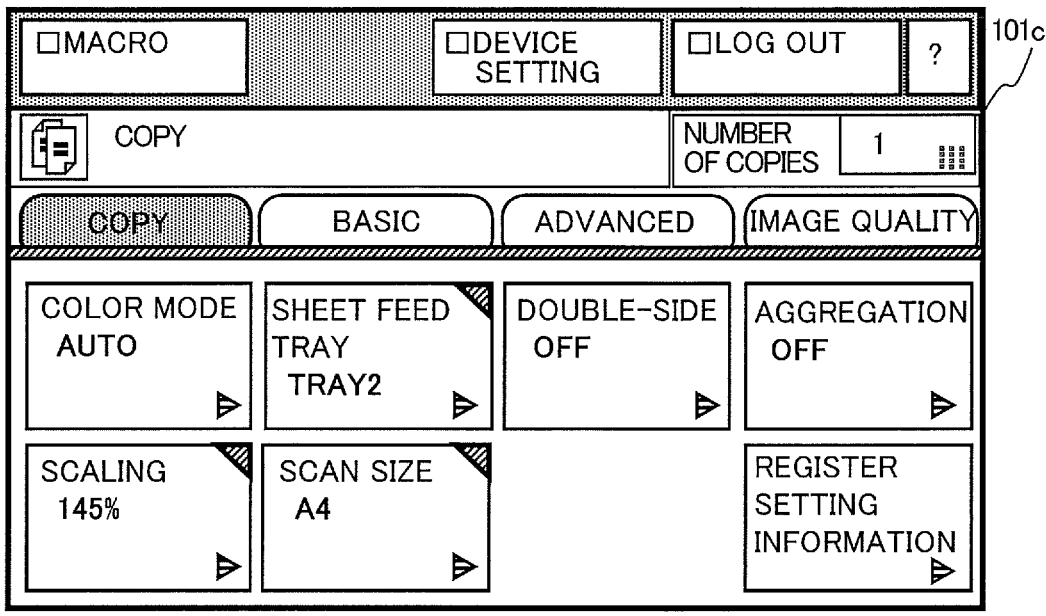
FIG. 28 is a screen diagram showing a display example of the copy standby screen displayed on the touch panel.

Then, the display control unit 14 displays a registration completion screen 112 (FIG. 27) on the display unit 13 (FIG. 15, F138), and after one second (FIG. 15, F139), erases the registration completion screen 112 (FIG. 27) and displays the copy standby screen 101c (FIG. 28) on the display unit 13 (FIG. 15, F140). Incidentally, the flow of the steps S301 to S313 corresponds to processing in transition numbers N115 to N119 in the display transition diagram of FIG. 10.

Figure 16:
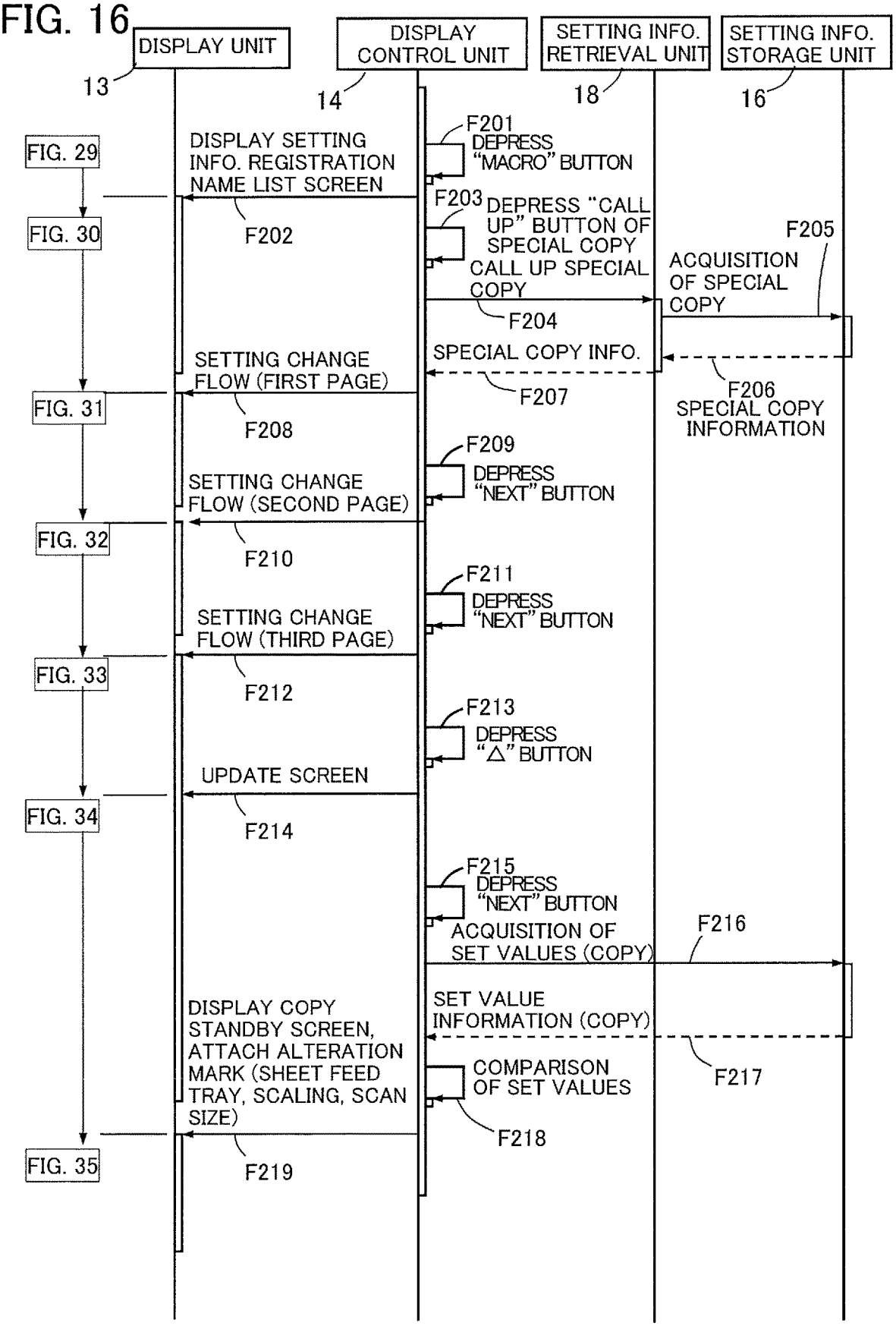
FIG. 16 is a sequence diagram showing the flow of signals among the display unit, the display control unit, a setting information retrieval unit and the setting information storage unit and display conditions of the display unit at the time of calling up setting information.

Next, an operation for calling up setting information having an already registered setting change flow will be described below with reference to a sequence diagram of FIG. 16. FIG. 16 is a sequence diagram showing the flow of signals among the display unit 13, the display control unit 14, the setting information retrieval unit 18 and the setting information storage unit 16 and display conditions of the display unit 13 at the time of calling up the setting information.

Figure 29:
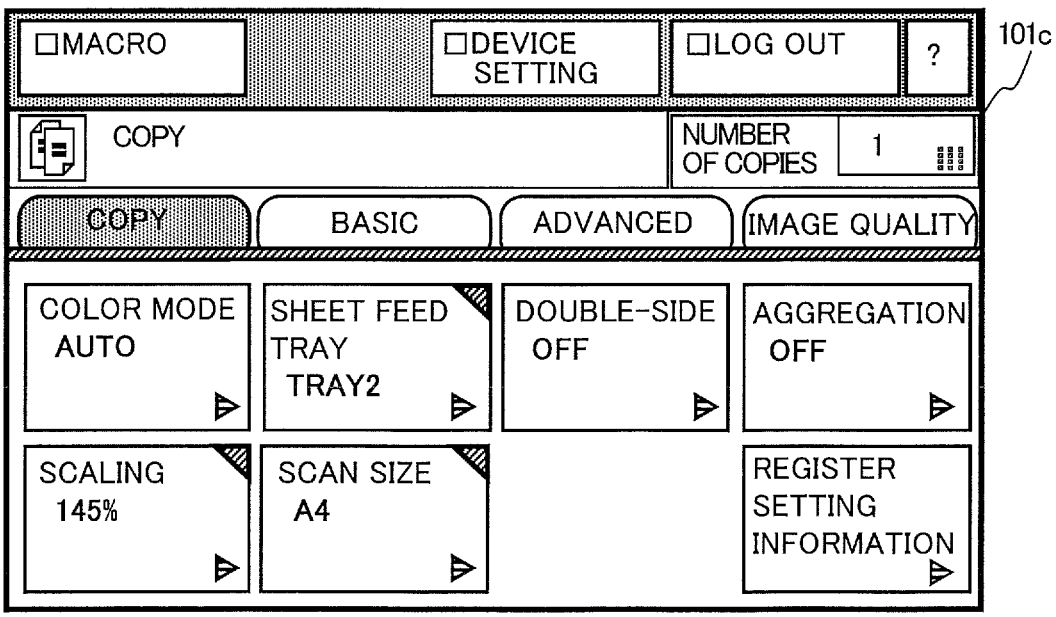
FIG. 29 is a screen diagram showing a display example of the copy standby screen displayed on the touch panel.

In the sequence diagram of FIG. 16, a display screen displayed by the display unit 13 at each time is represented by a figure number (FIG. 29, FIG. 30, etc.), which means that a screen shown in the figure having the figure number is displayed.

When a "macro" button 201h at the top of the screen is depressed (F201) while the copy standby screen 101 (FIG. 29) is displayed on the display unit 13, the display control unit 14 displays the setting information registration name list screen 113 (FIG. 30) on the display unit 13 (F202). When a "call up" button 213a whose setting information registration name is "special copy" on the list screen 113 is depressed by using the touch panel 12 as the selection unit overlapping with the display unit 13 (F203), the display control unit 14 commands the setting information retrieval unit 18 to call up setting information whose setting information registration name is "special copy" (F204), and the setting information retrieval unit 18 acquires the information whose setting information registration name is "special copy" from the setting information storage unit 16 (F205-F206) and passes on the acquired information to the display control unit 14 (F207).

The display control unit 14 executes a macro according to the setting change flow whose setting information registration name is "special copy". First, the display control unit 14 displays the sheet feed tray setting screen 102b (FIG. 31) as the first page of the received information on the display unit 13 (F208). It is assumed here that the user checks the displayed settings and thereafter depresses the "next" button 202c (F209) without making a setting change.

In this case, the display control unit 14 displays the TRAY2 sheet size setting screen 103b (FIG. 32) as the second page of the received information on the display unit 13 according to the setting change flow (F210). It is assumed here that the user checks the displayed settings and thereafter depresses the "next" button 203c (F211) without making a setting change.

Figure 33:
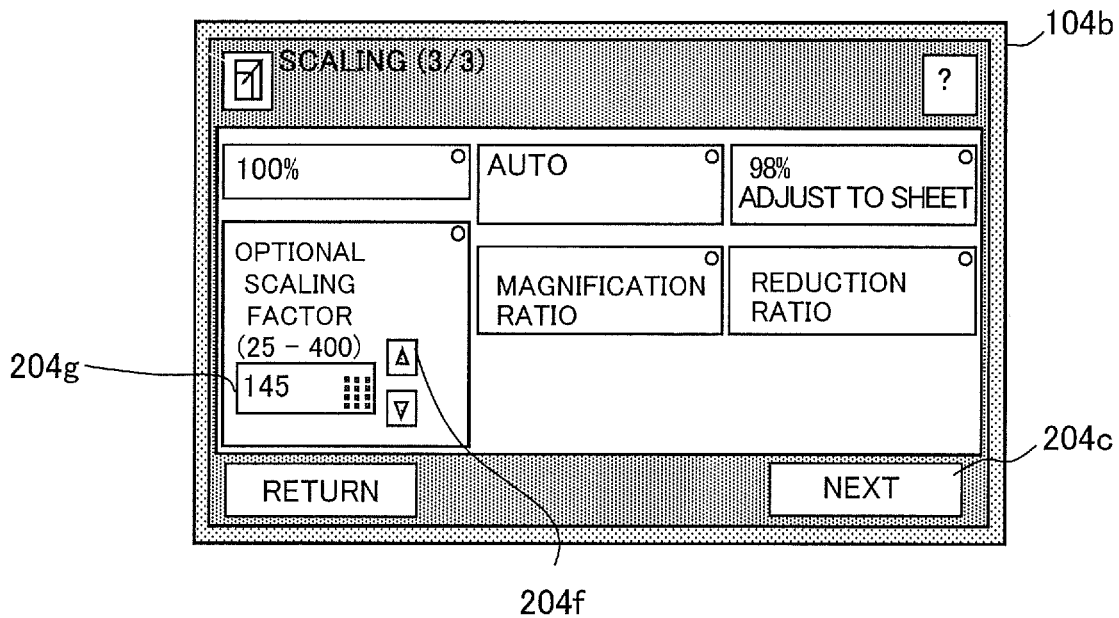
FIG. 33 is a screen diagram showing a display example of the scaling setting screen displayed on the touch panel.
Figure 34:
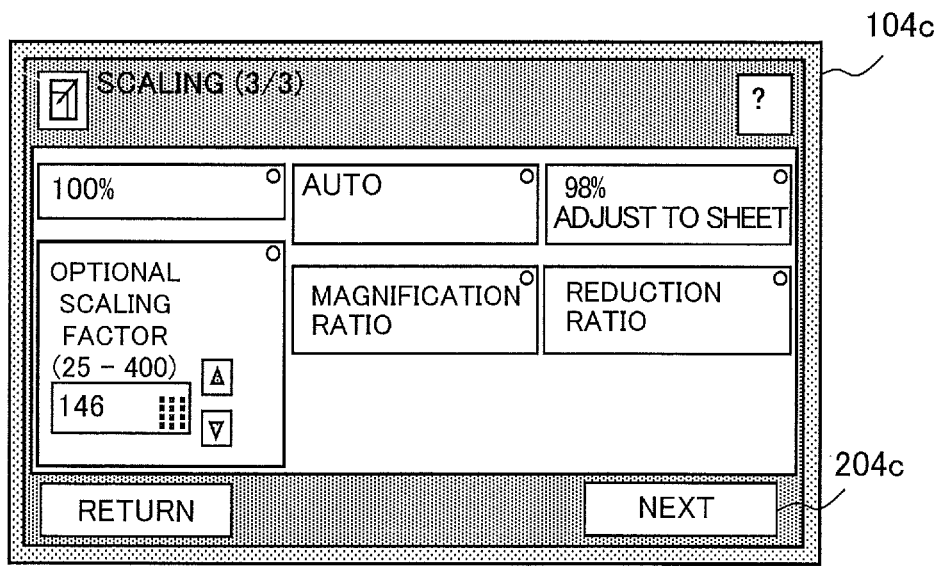
FIG. 34 is a screen diagram showing a display example of the scaling setting screen displayed on the touch panel.

In this case, the display control unit 14 displays the scaling setting screen 104b (FIG. 33) as the third page of the received information on the display unit 13 according to the setting change flow (F212). It is assumed here that the user viewing the displayed settings depressed a "Filled triangle mark" button 204f (F213) to change the scaling factor and made the setting change.

In this case, the display control unit 14 makes the display unit 13 display an updated scaling setting screen 104c on which the optional scaling factor displayed in a scaling factor display part 204g has been changed from "145%" on the scaling setting screen 104b to "146%" due to the setting change (F214). It is assumed here that the user checks the displayed settings and thereafter depresses the "next" button 204c (F215).

Figure 35:
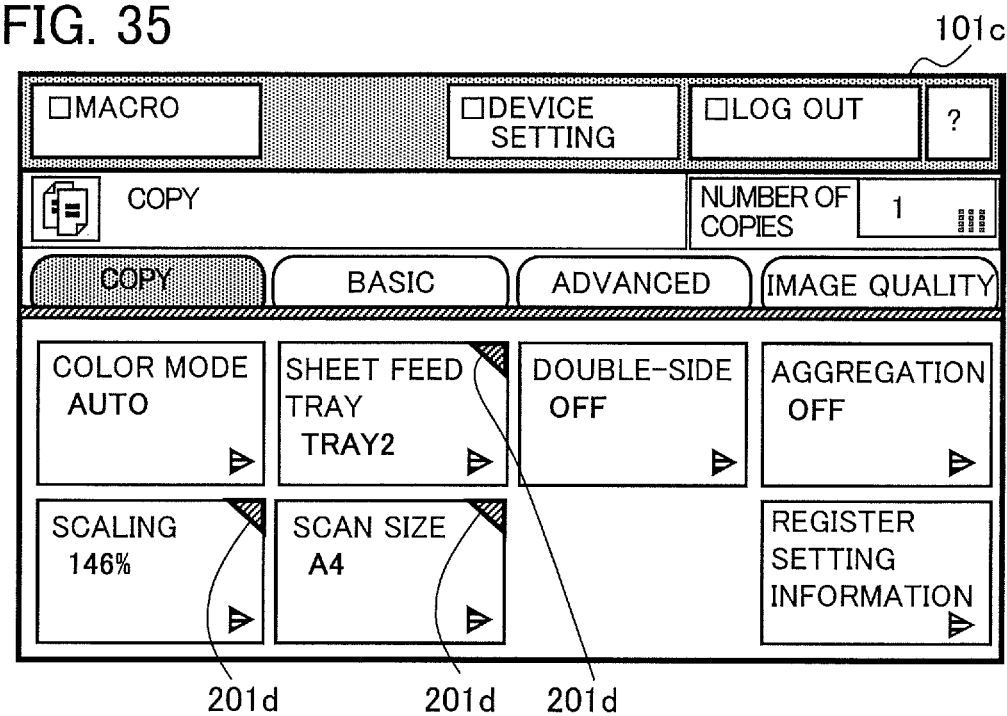
FIG. 35 is a screen diagram showing a display example of the copy standby screen displayed on the touch panel.

Since the setting change flow is completed, the display control unit 14 acquires the default set values of the setting items of the copy function from the setting information storage unit 16 (F216-F217), compares the set value information whose setting information registration name is "special copy" passed on from the setting information retrieval unit 18 with the default set values acquired from the setting information storage unit 16 and thereby identifies each setting item differing from the default value (F218), and makes the display unit 13 display an updated copy standby screen 101c (FIG. 35) obtained by providing the alteration mark 201d on the button of the identified setting item on the copy standby screen 101 (FIG. 29) (F219).

Incidentally, while an example of executing a macro by registering the "sheet feed tray setting screen", the "TRAY2 sheet size setting screen" and the "scaling setting screen" as the setting change screens was shown in the above description of the copy function, the operation is not limited to this example; it is also possible to configure the operation to execute a macro by selecting desired items from the setting items of the copy function shown in Table 1 and registering the selected items as the setting change screens.

As described above, in the image forming apparatus 1, when the copy function is executed, setting screens of setting items having a high possibility of resetting, e.g., the setting screens of the "sheet feed tray", the "TRAY2 sheet size" and the "scaling factor" in this embodiment, are previously designated as the setting change screens. Then, the setting change flow, executing a macro that successively displays these designated setting screens and enables setting changes (e.g., only these designated setting screens) and enables setting changes, and the corresponding set value information are registered in the setting information storage unit as the setting information while attaching the setting information registration name to the setting information. Accordingly, when the user makes a resetting, the user selects an intended setting information registration name, such as "special copy", from the setting information registration name list screen and thereby makes the resetting by operating the successively displayed setting screens of the "sheet feed tray", the "TRAY2 sheet size" and the "scaling factor" as needed.

After finishing the above-described settings, the user depresses the start key 15i of the operation panel and thereby makes the image forming apparatus 1 execute a copy process according to the above-described settings.

Incidentally, while set values that were set in the first setting process are displayed on the setting screens displayed at the time of resetting in the example described in the above embodiment, the display of the set values is not limited to this example; it is also possible to display the default values, for example.

First Modification

While the registration and the calling up of setting information in the operation of the copy function selected from the functions of the image forming apparatus 1 by depressing the copy key 15b (FIG. 2) have been described in the above embodiment, the following description in a first modification will be given of the registration and the calling up of setting information in the operation of the scan function selected from the functions of the image forming apparatus 1 by depressing the scan key 15c (FIG. 2).

The setting information storage unit 16 stores the set value and the default value of each of the setting items that have been set as conditions of the functions of the image forming apparatus 1. Tables 2-1 and 2-2 show the contents of the information stored in regard to the scan function.

TABLE 2-1

Setting Items, Set Values and Default Values of Scan Function.

| Setting Item | Set Value | Default Value |
|---|---|---|
| Color Mode | Automatic, Color, Gray Scale, Monochrome | Automatic |
| Scan Size | Automatic, A3, A4, A5, B4, B5, B6, Letter, Legal14, Legal13, Postcard | Automatic |
| Frame Erasure | On, Off | On |
| Center Erasure | On, Off | On |
| Resolution | 75, 100, 150, 200, 300, 400, 600 dpi | 200 |

TABLE 2-1-continued

Setting Items, Set Values and Default Values of Scan Function.

| Setting Item | Set Value | Default Value |
|---|---|---|
| Document Type | Text, Text/Photo, Photo, Glossy Photo | Text |
| Background Removal | Automatic, Off, 1, 2, 3, 4, 5, 6 | Automatic |
| Density | −3, −2, −1, 0, +1, +2, +3 | 0 |
| Contrast | −3, −2, −1, 0, +1, +2, +3 | 0 |
| Hue Control | −3, −2, −1, 0, +1, +2, +3 | 0 |
| Saturation Control | −3, −2, −1, 0, +1, +2, +3 | 0 |
| Red Control | −3, −2, −1, 0, +1, +2, +3 | 0 |
| Green Control | −3, −2, −1, 0, +1, +2, +3 | 0 |
| Blue Control | −3, −2, −1, 0, +1, +2, +3 | 0 |
| File Format/ Color | Single-PDF, Multi-PDF, Single-HC-PDF, Multi-HC-PDF, Multi-PDF/A, Single-TIFF, Multi-TIFF, JPEG, XPS | Single-PDF |
| File Format/ Gray Scale | Single-PDF, Multi-PDF, Single-HC-PDF, Multi-HC-PDF, Multi-PDF/A, Single-TIFF, Multi-TIFF, JPEG, XPS | Single-PDF |
| File Format/ Monochrome | Single-PDF, Multi-PDF, Multi-PDF/A, Single-TIFF, Multi-TIFF, XPS | Single-PDF |

TABLE 2-2

Setting Items, Set Values and Default Values of Scan Function.

| Setting Item | Set Value | Default Value |
|---|---|---|
| Encrypted PDF Setting/ Document-Opening Password | Password | |
| Encrypted PDF Setting/ Authorization Password | Password | |
| Encrypted PDF Setting/ Password Display | Valid, Invalid | Valid |
| Compression Level/ Color | High, Middle, Low | High |
| Compression Level/ Gray Scale | High, Middle, Low | High |
| Compression Level/ Monochrome | High, Middle, Raw Format | High |

Also in the scan function operation, the procedure of the setting change operation is carried out similarly to the procedure in the copy function operation shown in the flowcharts of FIG. 11 and FIG. 12. Specifically, a scan standby screen (corresponding to 101 in FIG. 17) is displayed on the display unit 13 in response to the depressing of the scan key 15c of the operation panel 11 shown in FIG. 2. In this case, in regard to the copy standby screen 101, the display "copy" is replaced with "scan" and buttons corresponding to the setting items in Tables 2-1 and 2-2 are arranged instead of the buttons like the "sheet feed tray" button 201b.

At this stage, for example, a "color mode" button corresponding to the setting item "COLOR MODE" shown in Table 2-1 is depressed, by which a color mode setting screen (corresponding to 102 in FIG. 18) is displayed. Incidentally, in regard to the sheet feed tray setting screen 102, the display "tray" is replaced with "color mode" and buttons corresponding to the color mode set values shown in Tables 2-1 and 2-2 are arranged instead of the buttons like the "tray-1 (A4)" button, i.e., TRAY1 button. At this stage, in response to the depressing of an icon button (corresponding to 202a in FIG. 18), setting screen information regarding the color mode setting screen of the scan function (corresponding to 102 in FIG. 18) is stored in the setting change screen queue 17a (FIG. 1) as a setting change screen.

The set value on the color mode setting screen (corresponding to 102 in FIG. 18) is changed from the default value (see Tables 2-1 and 2-2) "automatic" to "monochrome" and the color mode setting screen displayed on the display unit 13 is updated to a changed color mode setting screen. Thereafter, when the "OK" button 202e on the color mode setting screen (corresponding to 102a in FIG. 21) is depressed, the display control unit 14 acquires the default set values of the setting items of the color mode function from the setting information storage unit 16, compares the default set values with the set values temporarily stored in the display control unit 14, identifies each setting item differing from the default value, and updates the scan standby screen (corresponding to 101 in FIG. 17) to a scan standby screen (corresponding to 101a in FIG. 22) in which the button of the identified setting item (color mode) is provided with the alteration mark 201d.

It is assumed here that setting changes have been made in a similar manner with the setting change designation designating each screen as a setting change screen by changing the setting item "color mode" shown in Table 2-1 from "automatic" to "monochrome", changing the "resolution" from 200 dpi to 300 dpi, and changing the "density" from "0" to "+2", and a setting change of the setting item "contrast" has been made from "0" to "−2" without the setting change designation.

In this case, when the "register setting information" button 201g is depressed while the scan standby screen after the setting change (corresponding to 101c in FIG. 23) is displayed on the display unit 13, a setting change flow, executing a macro that successively displays the setting screens (e.g., only the setting screens) that underwent the setting change designation and enables setting changes, and the corresponding set value information are registered in the setting information storage unit 16 as the setting information together with a setting information registration name such as "scan setting-1" (see FIG. 5).

The operation of calling up setting information having an already registered setting change flow is carried out similarly to that in the case where the setting information registration name is "special copy" explained earlier with reference to the sequence diagram of FIG. 16.

When the "macro" button 201h is depressed while the scan standby screen (corresponding to 101 in FIG. 29) is displayed on the display unit 13, the display control unit 14 displays the setting information registration name list screen (corresponding to 113 in FIG. 30) on the display unit 13. When a "call up" button (not shown) whose setting information registration name is "scan setting-1" on the list screen is depressed, the setting information called up from the setting information storage unit 16 is passed on to the display control unit 14.

According to the setting change flow whose setting information registration name is "scan setting-1", the display control unit 14 first displays a "color mode" setting screen as the first page of the received information (corresponding to 102b in FIG. 31), subsequently displays a "resolution" setting screen as the second page (corresponding to 103b in FIG. 32) on the display unit 13, and subsequently displays a "density" setting screen as the third page (corresponding to 104b in FIG. 33) on the display unit 13.

The user is enabled to change a set value again at the stage when each setting screen is on display. Thereafter, the alteration mark provision process is carried out. This process is carried out according to the aforementioned processing in the process numbers F216-F219 in the sequence diagram of FIG. 16. After finishing the above-described settings, the user depresses the start key 15*i* of the operation panel and thereby makes the image forming apparatus 1 execute a scan process according to the above-described settings.

Second Modification

In a second modification, a description will be given of the registration and the calling up of setting information in the operation of the fax function selected from the functions of the image forming apparatus 1 by depressing the fax key 15*e* (FIG. 2).

The setting information storage unit 16 stores the set value and the default value of each of the setting items that have been set as conditions of the functions of the image forming apparatus 1. Table 3 shows the contents of the information stored in regard to the fax function.

TABLE 3

Setting Items, Set Values and Default Values of Fax Function.

| Setting Item | | Set Value | Default Value |
|---|---|---|---|
| Caller Name | | On, Off | On |
| Transmission Report | | On, Off | On |
| F Polling | | On, Off | Off |
| F Polling | Subaddress | Direct Input (Within 20 One-Byte Characters) | Blank |
| | Password | Direct Input (Within 20 One-Byte Characters) | Blank |
| F Code Transmission | | On, Off | Off |
| F Code Transmission | Subaddress | Direct Input (Within 20 One-Byte Characters) | Blank |
| | Password | Direct Input (Within 20 One-Byte Characters) | Blank |
| Memory Transmission | | On, Off | On |
| Echo Processing (For Transmission) | | Valid, Invalid | Valid |
| Modem Transmission Rate (For Transmission) | | 33.6 kbps, 28.8 kbps, 14.4 kbps, 9.6 kbps, 4.8 kbps | 33.6 kbps |
| Signal Transmission Level | | 0 dB-15 dB | 0 dB |
| Tone Signal Transmission Level | | 0 dB-15 dB | 0 dB |
| Pulse Generation Rate | | 33%, 39%, 40% | 33% |
| Pulse Dial Type | | N, 10 − N, N + 1 | N |
| Tone Transmission Time | | 75 ms, 85 ms, 100 ms | 75 ms |
| Connection Timeout | | 1 sec-255 sec | 10 sec |
| PBX Line | | On, Off | On |

Also in the fax function operation, the procedure of the setting change operation is carried out similarly to the procedure in the copy function operation shown in the flowcharts of FIG. 11 and FIG. 12. Specifically, a fax standby screen (corresponding to 101 in FIG. 17) is displayed on the display unit 13 in response to the depressing of the fax key 15*e* of the operation panel 11 shown in FIG. 2. In this case, in regard to the copy standby screen 101, the display "copy" is replaced with "fax" and buttons corresponding to the setting items in Table 3 are arranged instead of the buttons like the "sheet feed tray" button 201*b*.

At this stage, for example, a "caller name" button (not shown) corresponding to the setting item "CALLER NAME" shown in Table 3 is depressed, by which a caller name setting screen (corresponding to 102 in FIG. 18) is displayed. Incidentally, in regard to the sheet feed tray setting screen 102, the display "tray" is replaced with "caller name" and buttons corresponding to the set values "ON" and "OFF" of the "CALLER NAME" shown in Table 3 are arranged instead of the buttons like the "TRAY1 (A4)" button. At this stage, in response to the depressing of an icon button (corresponding to 202*a* in FIG. 18), setting screen information regarding the caller name setting screen of the fax function (corresponding to 102 in FIG. 18) is stored in the setting change screen queue 17*a* (FIG. 1) as a setting change screen.

The set value on the caller name setting screen (corresponding to 102 in FIG. 18) is changed from the default value (see Table 3) "ON" to "OFF" and the caller name setting screen displayed on the display unit 13 is updated to a changed caller name setting screen. Thereafter, when the "OK" button 202*e* on the caller name setting screen (corresponding to 102*a* in FIG. 21) is depressed, the display control unit 14 acquires the default set values of the setting items of the fax function from the setting information storage unit 16, compares the default set values with the set values temporarily stored in the display control unit 14, identifies each setting item differing from the default value, and updates the fax standby screen (corresponding to 101 in FIG. 17) to a fax standby screen (corresponding to 101*a* in FIG. 22) in which the button of the identified setting item (caller name) is provided with the alteration mark 201*d*.

It is assumed here that setting changes have been made in a similar manner with the setting change designation designating each screen as a setting change screen by changing the setting item "caller name" shown in Table 3 from "ON" to "OFF", changing the "modem transmission rate" from 33.6 Kbps to 14.4 Kbps, and changing the "connection timeout" from "10 sec (i.e., 10 second)" to "30 sec", and the setting item "tone transmission time" has been changed from "75 ms (i.e., 75 millisecond)" to "85 ms" without the setting change designation.

In this case, when the "register setting information" button 201*g* is depressed while the fax standby screen after the setting change (corresponding to 101*c* in FIG. 23) is displayed on the display unit 13, a setting change flow, executing a macro that successively displays the setting screens (e.g., only the setting screens) that underwent the setting change designation and enables setting changes, and the corresponding set value information are registered in the setting information storage unit 16 as the setting information together with a setting information registration name such as "fax setting-1" (see FIG. 5).

The operation of calling up setting information having an already registered setting change flow is carried out similarly to that in the case where the setting information registration name is "special copy" explained earlier with reference to the sequence diagram of FIG. 16.

When the "macro" button 201*h* is depressed while the fax standby screen (corresponding to 101 in FIG. 29) is displayed on the display unit 13, the display control unit 14 displays the setting information registration name list screen (corresponding to 113 in FIG. 30) on the display unit 13. When a "call up" button (not shown) whose setting information registration name is "fax setting-1" on the list screen is depressed, the setting information called up from the setting information storage unit 16 is passed on to the display control unit 14.

According to the setting change flow whose setting information registration name is "fax setting-1", the display control unit 14 first displays a "caller name" setting screen as the first page of the received information (corresponding to 102*b* in FIG. 31), subsequently displays a "modem transmission rate" setting screen as the second page (corresponding to 103*b* in FIG. 32) on the display unit 13, and subsequently displays a "connection timeout" setting screen as the third page (corresponding to 104*b* in FIG. 33) on the display unit 13.

The user is enabled to change a set value again at the stage when each setting screen is on display. Thereafter, the alteration mark provision process is carried out. This process is carried out according to the aforementioned processing in the process numbers F216-F219 in the sequence diagram of FIG. 16. After finishing the above-described settings, the user depresses the start key 15*i* of the operation panel and thereby makes the image forming apparatus 1 execute a fax process according to the above-described settings.

Third Modification

In a third modification, a description will be given of the registration and the calling up of setting information in the operation of the e-mail function selected from the functions of the image forming apparatus 1 by depressing the e-mail key 15*m* (FIG. 2).

The setting information storage unit 16 stores the set value and the default value of each of the setting items that have been set as conditions of the functions of the image forming apparatus 1. Table 4 shows the contents of the information stored in regard to the e-mail function.

TABLE 4

Setting Items, Set Values and Default Values of E-Mail Function.

| Setting Item | | Set Value | Default Value |
|---|---|---|---|
| File Name | | Direct Input (Within 64 One-Byte Characters or 32 Double-Byte Characters) | Blank |
| Mail Edit Fixed Phrase | Subject Edit | Direct Input (Within 80 One-Byte Characters or 40 Double-Byte Characters) | Blank |
| | Body Edit | Direct Input (Within 256 One-Byte Characters or 128 Double-Byte Characters) | Blank |
| Sender | | Direct Input (Within 80 One-Byte Characters or 40 Double-Byte Characters) | Blank |
| Sender Name | | Direct Input (Within 32 One-Byte Characters or 16 Double-Byte Characters) | Blank |
| Return Destination | | Direct Input (Within 80 One-Byte Characters or 40 Double-Byte Characters) | Blank |
| Broadcast Destination Check | | On, Off | On |
| MDN Response Transmission | | On, Off | On |
| Automatic Print Setting of Communication Management Report | | On, Off | On |
| MCF Report Print Setting | | On, Off | On |
| MCF Report Print Timeout | | Off, 5 min, 15 min, 30 min, 90 min, 150 min | Off |
| Check Message Print | | On, Off | On |

Also in the e-mail function operation, the procedure of the setting change operation is carried out similarly to the procedure in the copy function operation shown in the flowcharts of FIG. 11 and FIG. 12. Specifically, an e-mail standby screen (corresponding to 101 in FIG. 17) is displayed on the display unit 13 in response to the depressing of the e-mail key 15*m* of the operation panel 11 shown in FIG. 2. In this case, in regard to the copy standby screen 101, the display "copy" is replaced with "e-mail" and buttons corresponding to the setting items in Table 4 are arranged instead of the buttons like the "sheet feed tray" button 201*b*.

At this stage, for example, a "file name" button (not shown) corresponding to the setting item "FILE NAME" shown in Table 4 is depressed, by which a file name setting screen (corresponding to 102 in FIG. 18) is displayed.

Incidentally, in regard to the sheet feed tray setting screen 102, the display "tray" is replaced with "file name", and a file name input area and a software keyboard screen necessary for inputting the file name are arranged, for example, instead of the buttons like the "TRAY1 (A4)" button. At this stage, in response to the depressing of an icon button (corresponding to 202*a* in FIG. 18), setting screen information regarding the file name setting screen of the e-mail function (corresponding to 102 in FIG. 18) is stored in the setting change screen queue 17*a* (FIG. 1) as a setting change screen.

The set value on the file name setting screen (corresponding to 102 in FIG. 18) is changed from the default value (see Table 4) "blank" to an intended file name inputted by the user and the file name setting screen displayed on the display unit 13 is updated to a changed file name setting screen. Thereafter, when the "OK" button 202*e* on the file name setting screen (corresponding to 102*a* in FIG. 21) is depressed, the display control unit 14 acquires the default set values of the setting items of the e-mail function from the setting information storage unit 16, compares the default set values with the set values temporarily stored in the display control unit 14, identifies each setting item differing from the default value, and updates the e-mail standby screen (corresponding to 101 in FIG. 17) to an e-mail standby screen (corresponding to 101*a* in FIG. 22) in which the button of the identified setting item (file name) is provided with the alteration mark 201*d*.

It is assumed here that setting changes have been made in a similar manner with the setting change designation designating each screen as a setting change screen by inputting a file name to the blank area of the setting item "file name" shown in Table 4, inputting a "subject" and a "body edit" to the blank area of the setting item "mail edit fixed phrase", and inputting a return destination name to the blank area of the "return destination", and the setting item "check message print" has been changed from "ON" to "OFF" without the setting change designation.

In this case, when the "register setting information" button 201*g* is depressed while the e-mail standby screen after the setting change (corresponding to 101*c* in FIG. 23) is displayed on the display unit 13, a setting change flow, executing a macro that successively displays the setting screens (e.g., only the setting screens) that underwent the setting change designation and enables setting changes, and the corresponding set value information are registered in the setting information storage unit 16 as the setting information together with a setting information registration name such as "mail setting-1" (see FIG. 5).

The operation of calling up setting information having an already registered setting change flow is carried out similarly to that in the case where the setting information registration name is "special copy" explained earlier with reference to the sequence diagram of FIG. 16.

When the "macro" button 201*h* is depressed while the e-mail standby screen (corresponding to 101 in FIG. 29) is displayed on the display unit 13, the display control unit 14 displays the setting information registration name list screen (corresponding to 113 in FIG. 30) on the display unit 13. When a "call up" button (not shown) whose setting information registration name is "mail setting-1" on the list screen is depressed, the setting information called up from the setting information storage unit 16 is passed on to the display control unit 14.

According to the setting change flow whose setting information registration name is "mail setting-1", the display control unit 14 first displays a "file name" setting screen as the first page of the received information (corresponding to 102b in FIG. 31), subsequently displays a "mail edit fixed phrase" setting screen as the second page (corresponding to 103b in FIG. 32) on the display unit 13, and subsequently displays a "return destination" setting screen as the third page (corresponding to 104b in FIG. 33) on the display unit 13.

The user is enabled to change a set value again at the stage when each setting screen is on display. Thereafter, the alteration mark provision process is carried out. This process is carried out according to the aforementioned processing in the process numbers F216-F219 in the sequence diagram of FIG. 16. After finishing the above-described settings, the user depresses the start key 15i of the operation panel and thereby makes the image forming apparatus 1 execute an e-mail transmission process according to the above-described settings.

Incidentally, while examples of executing a macro according to setting items belonging to one of the copy function, the scan function, the fax function and the e-mail function and subsequently executing a corresponding functional process have been described in the above embodiment and first through third modifications, the present invention is not restricted to such examples.

For example, a variety of modes can be employed, such as first executing a macro whose setting information registration name is "scan setting-1" in the scan function described in the first modification, subsequently executing a macro whose setting information registration name is "mail setting-1" in the e-mail function described in the third modification, finalizing the set values, and thereafter successively carrying out the scan process and the e-mail transmission process.

As described above, with the image forming apparatus 1 according to this embodiment, setting screens (e.g., only setting screens) of setting items having a high possibility of resetting, previously selected from a lot of setting items, are successively displayed by use of a macro and the resetting is made possible, by which the complexity at the time of making the setting of each setting item, including the resetting, can be eliminated.

While examples of employing the present invention for an image forming apparatus have been described in the above embodiment, the present invention is not restricted to such examples but is generally applicable to various types of apparatuses having setting information.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An image processing method comprising:
   a first step of successively displaying a plurality of screens for making a plurality of settings including a setting of a first set value, designating a target of recalling among the plurality of screens and registering a first name while associating the designated target with the first name, in a process of executing a prescribed function;
   a second step of displaying a resetting screen for making a resetting of the first set value associated with the first name based on the designated target, when the first name is selected; and
   a third step of executing the prescribed function based on the resetting performed on the resetting screen, wherein
   the first name is associated with setting information regarding the resetting screen for making the setting of the first set value as the designated target of recalling in the first step, and
   the first set value is displayed on the resetting screen in the second step and the resetting of the first set value is prompted.

2. The image processing method according to claim 1, wherein
   the setting information includes display command information for executing a process of displaying the resetting screen and prompting the resetting of the first set value, and
   the second step is executed based on the display command information when the first name is selected.

3. The image processing method according to claim 1, wherein the setting information includes a second set value set on a second screen not handled as a target of the recalling.

4. The image processing method according to claim 3, wherein the setting information includes a third set value remaining at a default value.

5. The image processing method according to claim 3, further comprising:
   a fourth step of attaching an alteration mark to a setting display part corresponding to a setting item having an already changed set value on a standby screen of the prescribed function when the first set value or the second set value has been changed from a corresponding default value.

6. The image processing method according to claim 1, wherein the first step includes a step of displaying contents of the setting information before a registration of the first screen and having a user confirm the setting information.

7. The image processing method according to claim 1, wherein an operation button for designating a display screen to be displayed next and a page display including a page number are displayed on the resetting screen.

8. An image forming method comprising:
   a first step of designating a first screen to be a target of recalling among a plurality of screens for making settings and registering a first name while associating the first screen with the first name, in a process of executing a prescribed function;
   a second step of displaying a redisplay screen that includes the first screen associated with the first name and prompting resetting on the redisplay screen, when the first name is selected; and
   a third step of executing the prescribed function when execution of the prescribed function is commanded, wherein
   the first name is assigned to setting information including a first set value set on the first screen and first screen information regarding the first screen in the first step, and
   resetting of the first set value on the redisplay screen is prompted in the second step.

9. An image processing apparatus comprising:
   a display that displays a first screen for making a setting of a first set value and being handled as a target of recalling and a second screen for making a setting of a second set value and being not handled as a target of the recalling, in a process of executing a prescribed function;
   storage that stores setting information including the first set value set on the first screen, the second set value set on the second screen and first screen information regarding the first screen, while associating the setting information with a first name;

a selector that selects the first name stored in the storage; and a controller that controls processing in the display, the storage and the selector, wherein when the first name stored in the storage is selected by the selector, the controller does not display the second screen for making the setting of the second set value, displays a resetting screen for making a resetting of the first set value, the first set value being displayed in the resetting screen, on the display and prompts the resetting of the first set value on the resetting screen.

10. The image processing apparatus according to claim 9, wherein the setting information includes display command information for executing a process of displaying the resetting screen and prompting the resetting of the first set value, and the controller executes processing based on the display command information when the first name stored in the storage-is selected by the selector.

11. The image processing apparatus according to claim 9, wherein the controller attaches an alteration mark to each setting display part corresponding to a setting item having an already changed set value on a standby screen of the prescribed function when the first set value or the second set value has been changed from corresponding default values.

12. The image processing apparatus according to claim 9, wherein the setting information includes a third set value remaining at a default value.

13. The image processing apparatus according to claim 12, wherein the prescribed function is executed according to the first set value, the second set value and the third set value when the execution of the prescribed function is commanded.

14. The image processing apparatus according to claim 9, wherein the controller displays contents of the setting information on the display.

* * * * *